United States Patent
Foerster et al.

(10) Patent No.: US 12,359,595 B2
(45) Date of Patent: Jul. 15, 2025

(54) PARTICLE FILTER WITH A PLURALITY OF COATINGS

(71) Applicant: UMICORE AG & CO. KG, Hanau-Wolfgang (DE)

(72) Inventors: Martin Foerster, Büdingen (DE); Benjamin Barth, Alzenau (DE); Manuel Gensch, Aschaffenburg (DE); Jan Schoenhaber, Darmstadt (DE)

(73) Assignee: UMICORE AG & CO, KG, Hanau-Wolfgang (DE)

( * ) Notice: Subject to any disclaimer, the term of this patent is extended or adjusted under 35 U.S.C. 154(b) by 857 days.

(21) Appl. No.: 17/292,080

(22) PCT Filed: Nov. 7, 2019

(86) PCT No.: PCT/EP2019/080489
§ 371 (c)(1),
(2) Date: May 7, 2021

(87) PCT Pub. No.: WO2020/094766
PCT Pub. Date: May 14, 2020

(65) Prior Publication Data
US 2021/0404357 A1    Dec. 30, 2021

(30) Foreign Application Priority Data
Nov. 8, 2018 (DE) .................. 10 2018 127 957.4

(51) Int. Cl.
*B01D 46/24* (2006.01)
*B01D 53/94* (2006.01)
(Continued)

(52) U.S. Cl.
CPC ......... *F01N 3/022* (2013.01); *B01D 46/2429* (2013.01); *B01D 46/24492* (2021.08);
(Continued)

(58) Field of Classification Search
CPC .......... B01D 46/24; B01D 53/94; B01J 35/00; B01J 35/02; B01J 35/04; B01J 35/10;
(Continued)

(56) References Cited

U.S. PATENT DOCUMENTS

| 108,408 A | 10/1870 | Tilghman |
| 1,967,235 A | 7/1934 | Ferkel |

(Continued)

FOREIGN PATENT DOCUMENTS

| CN | 1490500 A | 4/2004 |
| CN | 1720093 A | 1/2006 |

(Continued)

OTHER PUBLICATIONS

Non Final Office Action mailed Dec. 9, 2021 in U.S. Appl. No. 17/292,059 (11 pages).
(Continued)

*Primary Examiner* — Sharon Pregler
(74) *Attorney, Agent, or Firm* — Smith, Gambrell & Russell, LLP

(57) ABSTRACT

The invention relates to a wall-flow filter, to a method for the production and the use of the filter for reducing harmful exhaust gases of an internal combustion engine. The wall-flow filter was produced by exposing the filter at least twice successively to a powder-gas aerosol.

25 Claims, 7 Drawing Sheets

Figure 1:
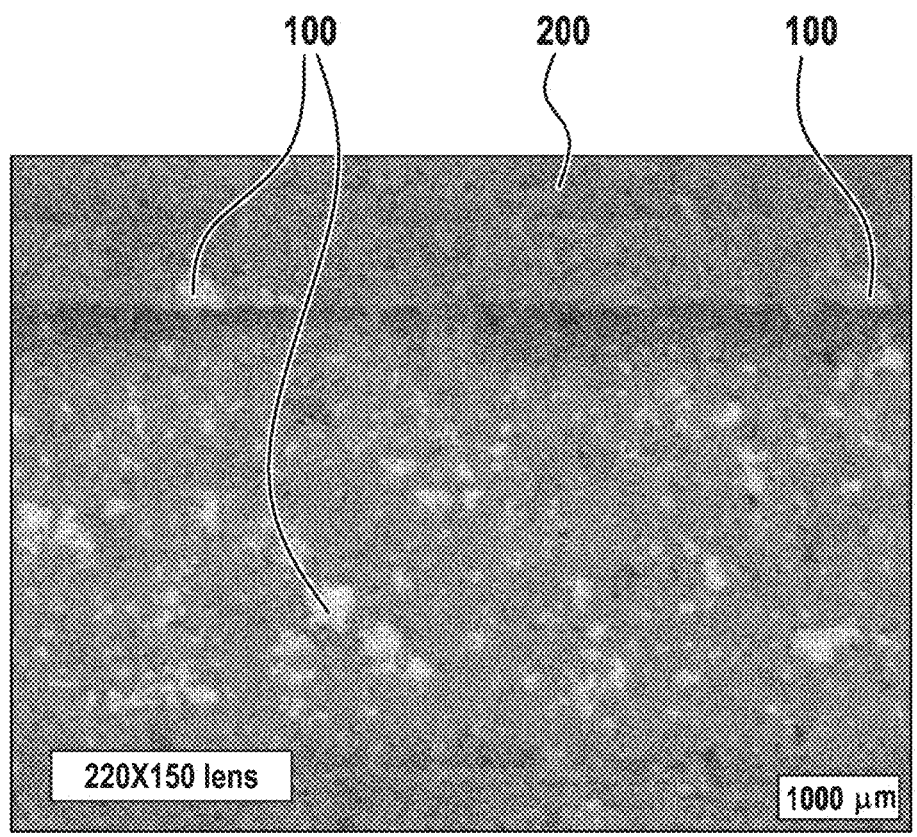

(51) Int. Cl.
| | |
|---|---|
| *B01J 35/31* | (2024.01) |
| *B01J 35/40* | (2024.01) |
| *B01J 35/56* | (2024.01) |
| *B01J 35/64* | (2024.01) |
| *B01J 37/02* | (2006.01) |
| *F01N 3/022* | (2006.01) |
| *F01N 3/035* | (2006.01) |
| *F01N 3/10* | (2006.01) |
| *F01N 3/28* | (2006.01) |
| *C04B 41/45* | (2006.01) |

(52) U.S. Cl.
CPC ....... *B01D 46/249* (2021.08); *B01D 53/9472* (2013.01); *B01J 35/31* (2024.01); *B01J 35/40* (2024.01); *B01J 35/56* (2024.01); *B01J 35/64* (2024.01); *B01J 37/0221* (2013.01); *F01N 3/035* (2013.01); *F01N 3/101* (2013.01); *F01N 3/2803* (2013.01); *B01D 46/2482* (2021.08); *B01D 53/9431* (2013.01); *B01D 53/9454* (2013.01); *B01D 2255/10* (2013.01); *B01D 2255/9032* (2013.01); *B01D 2255/9155* (2013.01); *B01D 2279/30* (2013.01); *C04B 41/4545* (2013.01); *F01N 2370/02* (2013.01)

(58) Field of Classification Search
CPC .......... B01J 37/02; F01N 3/022; F01N 3/035; F01N 3/10; F01N 3/28
See application file for complete search history.

(56) References Cited

U.S. PATENT DOCUMENTS

| | | | |
|---|---|---|---|
| 2,488,440 | A | 11/1949 | Schaumann |
| 4,609,563 | A | 9/1986 | Shimrock et al. |
| 6,220,791 | B1 | 4/2001 | Hutchins |
| 6,478,874 | B1 | 11/2002 | Rosynsky et al. |
| 6,548,105 | B2 | 4/2003 | Kiessling et al. |
| 6,875,725 | B2 | 4/2005 | Lindner et al. |
| 7,306,771 | B2 | 12/2007 | Okawara |
| 7,985,380 | B2 | 7/2011 | Brück |
| 8,277,880 | B2 | 10/2012 | Sato et al. |
| 8,388,721 | B2 | 3/2013 | Ishizawa |
| 8,454,917 | B2 * | 6/2013 | Hoyer ................ B01J 23/58 502/340 |
| 8,495,968 | B2 | 7/2013 | Tsuji et al. |
| 8,534,221 | B2 | 9/2013 | Tsuji et al. |
| 8,632,852 | B2 | 1/2014 | Tsuji et al. |
| 8,663,588 | B2 | 3/2014 | Lindner et al. |
| 8,678,196 | B2 | 3/2014 | Kaiser et al. |
| 8,794,178 | B2 | 8/2014 | Mergner et al. |
| 8,940,259 | B2 | 1/2015 | Brown et al. |
| 9,347,354 | B2 | 5/2016 | Pfeifer et al. |
| 9,517,462 | B2 | 12/2016 | Roesch et al. |
| 9,745,227 | B2 | 8/2017 | Cai et al. |
| 10,188,975 | B2 | 1/2019 | Fu et al. |
| 10,247,079 | B2 | 4/2019 | Tabata |
| 10,279,313 | B2 | 5/2019 | Gabrielsson |
| 10,294,838 | B2 | 5/2019 | Itoh et al. |
| 11,566,548 | B2 | 1/2023 | Foerster et al. |
| 2001/0003351 | A1 | 6/2001 | Chen et al. |
| 2008/0107806 | A1 | 5/2008 | Mergner et al. |
| 2008/0317646 | A1 | 12/2008 | Morisaka et al. |
| 2011/0030346 | A1 | 2/2011 | Neubauer et al. |
| 2011/0229634 | A1 | 9/2011 | Tsuji et al. |
| 2011/0229635 | A1 | 9/2011 | Tsuji et al. |
| 2011/0271658 | A1* | 11/2011 | Hoyer ................ B01J 23/63 502/328 |
| 2013/0243659 | A1 | 9/2013 | Sutton et al. |
| 2016/0310935 | A1 | 10/2016 | Sutton et al. |
| 2016/0375429 | A1 | 12/2016 | Chandler et al. |
| 2017/0296969 | A1 | 10/2017 | Ohashi et al. |
| 2018/0298800 | A1 | 10/2018 | Clowes et al. |
| 2019/0060885 | A1 | 2/2019 | Welsch et al. |
| 2021/0396167 | A1 | 12/2021 | Foerster et al. |
| 2022/0325645 | A1 | 10/2022 | Gensch et al. |
| 2023/0127269 | A1 | 4/2023 | Foerster et al. |

FOREIGN PATENT DOCUMENTS

| | | | |
|---|---|---|---|
| CN | 102188857 | A | 9/2011 |
| CN | 102281946 | A | 12/2011 |
| CN | 102762827 | A | 10/2012 |
| CN | 103079683 | A | 5/2013 |
| CN | 104838099 | A | 8/2015 |
| CN | 105561685 | A | 5/2016 |
| CN | 106164429 | A | 11/2016 |
| CN | 107636271 | A | 1/2018 |
| CN | 107921367 | A | 4/2018 |
| CN | 108350777 | A | 7/2018 |
| CN | 108697980 | A | 10/2018 |
| DE | 948415 | C | 8/1956 |
| DE | 952891 | C | 11/1956 |
| DE | 4225970 | C1 | 4/1994 |
| DE | 19921409 | A1 | 11/2000 |
| DE | 102009010711 | A1 | 9/2010 |
| DE | 102010007499 | A1 | 8/2011 |
| DE | 102010015364 | A1 | 10/2011 |
| EP | 1 064 094 | B1 | 9/2002 |
| EP | 1 181 970 | B1 | 2/2004 |
| EP | 1 136 462 | B1 | 8/2004 |
| EP | 1 576 998 | A2 | 9/2005 |
| EP | 2 388 072 | A1 | 11/2011 |
| EP | 2 412 419 | A1 | 2/2012 |
| EP | 2 415 522 | A1 | 2/2012 |
| EP | 2 502 661 | A2 | 9/2012 |
| EP | 2 521 618 | B1 | 8/2013 |
| EP | 1 541 220 | B1 | 2/2014 |
| EP | 2 727 640 | A1 | 5/2014 |
| EP | 2 502 662 | B1 | 6/2014 |
| EP | 2 783 755 | A1 | 10/2014 |
| EP | 2 576 021 | B1 | 12/2014 |
| EP | 2 832 962 | A1 | 2/2015 |
| EP | 2 371 451 | B1 | 3/2016 |
| EP | 2 371 452 | B1 | 3/2016 |
| EP | 1 789 190 | B1 | 6/2017 |
| JP | H01-151706 | A | 6/1989 |
| JP | 2004-275814 | A | 10/2004 |
| JP | 2008/215337 | A | 9/2008 |
| JP | 5378659 | B2 | 12/2013 |
| JP | 2014-205108 | A | 10/2014 |
| WO | 99/47260 | A1 | 9/1999 |
| WO | 2005/016497 | A1 | 2/2005 |
| WO | 2005/022667 | A2 | 3/2005 |
| WO | 2008/000449 | A2 | 1/2008 |
| WO | 2008/113445 | A1 | 9/2008 |
| WO | 2010/015573 | A2 | 2/2010 |
| WO | 2010/097146 | A1 | 9/2010 |
| WO | 2011/151711 | | 12/2011 |
| WO | 2012/030534 | A1 | 3/2012 |
| WO | 2014-087472 | A1 | 6/2014 |
| WO | 2015/049110 | A1 | 4/2015 |
| WO | 2015/121248 | A1 | 8/2015 |
| WO | 2015/143191 | A1 | 9/2015 |
| WO | 2017/056067 | | 4/2017 |
| WO | 2017/075328 | A1 | 5/2017 |
| WO | 2018/115900 | A1 | 6/2018 |
| WO | 2018/172299 | A1 | 9/2018 |
| WO | 2019/089806 | A1 | 5/2019 |
| WO | 2020/094760 | A1 | 5/2020 |
| WO | 2020/094763 | A1 | 5/2020 |

OTHER PUBLICATIONS

Non Final Office Action mailed Jun. 28, 2023 in U.S. Appl. No. 18/069,736 (13 pages).
Non Final Office Action mailed Jun. 7, 2023 in U.S. Appl. No. 17/292,068 (8 pages).
U.S. Appl. No. 18/069,736, filed Dec. 21, 2022, Foerster et al.
Notice of Allowance and Fees Due mailed Oct. 3, 2022 in U.S. Appl. No. 17/292,059 (11 pages).

(56) References Cited

OTHER PUBLICATIONS

Notice of Allowance and Fees Due mailed Feb. 1, 2023 in U.S. Appl. No. 17/292,068 (9 pages).
Translation of Chinese First Office Action mailed Jan. 30, 2023 for Chinese Patent Application No. 201980073214.2 (13 pages).
Translation of Chinese First Office Action mailed Feb. 1, 2023 for Chinese U.S. Appl. No. 17/292,059.0 (11 pages). [Family member of U.S. Appl. No. 17/292,059, which has been issued to Applicant as U.S. Pat. No. 11,566,548].
Office Action and Search Report mailed Sep. 28, 2023 for Chinese Patent Application No. 201980073214.2 (8 pages in Chinese; 8 pages English Translation).
U.S. Appl. No. 17/292,059, filed May 7, 2021, Foerster, et al.
U.S. Appl. No. 17/292,068, filed May 7, 2021, Foerster, et al.
International Preliminary Report on Patentability dated May 11, 2021 for International Patent Application No. PCT/EP2019/080489 (6 pages in German with English Translation).
Written Opinion of the International Searching Authority dated Jan. 24, 2020 for International Patent Application No. PCT/EP2019/080489 (5 pages in German with English Translation).
International Search Report dated Jan. 24, 2020 for International Patent Application No. PCT/EP2019/080489 (3 pages in German with English Translation).
Gutsch, A. et al. Gas-Phase Production of Nanoparticles.KONA. 2002. No. 20. 14 pages.
Ulrich, G. Theory of Particle Formation and Growth in Oxide Synthesis Flames. Combustion Science and Technology. 21971. vol. 4. pp. 47-57.
Ihalainen, M., et al. Break-Up and bounce of TiO2 agglomerates by impaction. J. In: Aerosol Science and Technology. 2014. vol. 48, No. 1, pp. 31-41.
Seipenbusch, M., et al. Interparticle forces in silica nanoparticle agglomerates Journal of Nanoparticle Research. 2010. vol. 12, No. 6, pp. 2037-2044.
Gensch, M. Dissertation, Mechanische Stabilität von Nanopartikel—Agglomeraten bei mechanischen Belastungen. 2018. ISBN: 978-3-8440-6110-9, Shaker Verlag.
Füchsel, S., et al. Trockene Desagglomeration von Nanopartikelagglomeraten in einer Sichtermühle. [Dry deagglomeration of nanoparticle agglomerates in a classifier mill]. Chemie Ingenieur Technik. 2011, 83, No. 8, pp. 1262-1275. (In German with English translation).
Li S., et al. Flame aerosol synthesis of nanostructured materials and functional devices: Processing, modeling, and diagnostics. Progress in Energy and Combustion Science (55). 2016. pp. 1-59.
Heck, R., et al., Catalytic Air Pollution Control—Commercial Technology, Wiley. 2002. pp. 86-89.
Aerosolgeneratoren Und—Dispergierer. accessed May 7, 2018. http://www.tsi.com/Aerosolgeneratoren-und-dispergierer/.
Pyrogenes Siliciumdioxid. Wikipedia. Accessed Nov. 16, 2018. https://de.wikipedia.org/w/index.php?title=Pyrogenes_Siliciumdioxid&oldid=1 82147815.
Aerosolgernatoren fur Feststoffe. Accessed May 7, 2018. https://www.palas.de/de/product/aerosolgeneratorssolidparticles.
Reindichte. Wikipedia. Accessed Nov. 16, 2018. https://de.wikipedia.org/w/index.php?title=Reindichte&oldid=164022376.
Pyrogenes Siliciumdioxid. Wikipedia. accessed Nov. 16, 2018. https://de.wikipedia.org/wiki/Pyrogenes_Siliciumdioxid.
Aerosil Fumed Silica and Aeoxide Fumed Alumina for Glossy Photo Inkjet Media. Technical Information 1331. https://www.aerosil.com/product/aerosil/downloads/ti-1331-aerosil-and-aeroxide-for-glossy-photo-inkjet-media-en.pdf.
Fumed silica process.svg. Wikimedia Commons. Accessed Nov. 28, 2016. https://commons.wikimedia.org/w/index.php?title=File:Fumed_silica process.svg&oldid=222460038.
Framework type AEI. Database of Zeolite Structures. accessed Apr. 10, 2018. http://europe.iza-structure.org/IZA-SC/framework.php?STC=CHA.
Framework type CHA. Database of Zeolite Structures. accessed Apr. 10, 2018. http://europe.iza-structure.org/IZA-SC/framework.php?STC=AEI.
ISO 13320: 2009(E). Particle size analysis—Laser diffraction Methods (60 pages).
DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
Mathis. U., et al., TEM analysis of volatile nanoparticles from particle trap equipped diesel and direct-injection spark-ignition vehicles. Atmospheric Environment. vol. 38. pp. 4347-4355.
Albers, P., et al. Kristallin und amorph Sand als Rohstoff. [Crystalline and amorphous sand as a raw material]. Chemie in unserer Zeit, 2016, vol. 50, pp. 162-171 (in German with English translation).
Von Karman, T. Ueber den Mechanismus des Widerstandes, den ein bewegter Körper in einer Flüssigkeit erfährt [About the mechanism of resistance a moving body experiences in a liquid] Nachr. Ges. Wiss. Göttingen, Math. Phys. Kl. 509 (1911); 547 (1912) (In German with English Translation).
Benard, H. Comptes rendus hebdomadaires des séances de l'Académie des sciences/ publiés . . . par MM. les secrétaires perpétuels. [Weekly reports of the sessions of the Academy of Sciences / published . . . by MM. perpetual secretaries] C. R. Acad. Sci. Paris Ser. IV 147, 839 (1908); 147, 970 (1908) (In French with English translation).
Hall, D.E., et al., Measurement of the Number of Siz Distribution of Particles Emitted from a Gasoline Direct Injection Vehicle. SAE. 1999-01-3530. pp. 1-11.
Ferkel, H., et al. Edelmetallfreie Nanokatalysatoren Für Dieselpartikelfilter [Non-Metal-Free Nanocatalysts for diesel Particulate Filters]. MTZ—Motortechnische Zeitschrift, 2010, vol. 71, pp. 128-133. In German with English translation.
Hinds, W.C. Aerosol technology: Properties, behavior and measurement of airborne particles. Wiley, $2^{nd}$ edition. 1999. 200 Pages.
Maricq, M.M., et al., Particulate Emissions from a Direct-Injection Spark-Ignition (DISI) Engine. SAE. 1999-01-1530. 1999. pp. 1-9.
ISO 11465—Soil Quality—Determination fo dry matter and water content on a mass basis—Gravimetric Method. 1993 (8 pages).
Stieß, M. Mechanical Process Engineering—Particle Technology 1, Springer, 3rd edition 2009. Kapitel 2. Kennzeichnungen von Partikeln und dispersen Stoffsystemen [Chapter 2 Identification of particles and disperse Substance systems] pp. 9-95 in German with English translation.
Final Office Action mailed Jun. 28, 2022 in U.S. Appl. No. 17/292,059 (14 pages).
Notice of Opposition to a European Patent mailed Apr. 11, 2023 in European Patent Application No. 19801526.5 (16 pages). [Family member of U.S. Appl. No. 17/292,068; now US Pub. 2022/0325645].
Jang, Hee Dong et al. Synthesis of SiO2 nanoparticles from sprayed droplets of tetraethylorthosilicate by the flame spray pyrolysis. Current Applied Physics 6S1. 2006. pp. e110 to e113.

\* cited by examiner

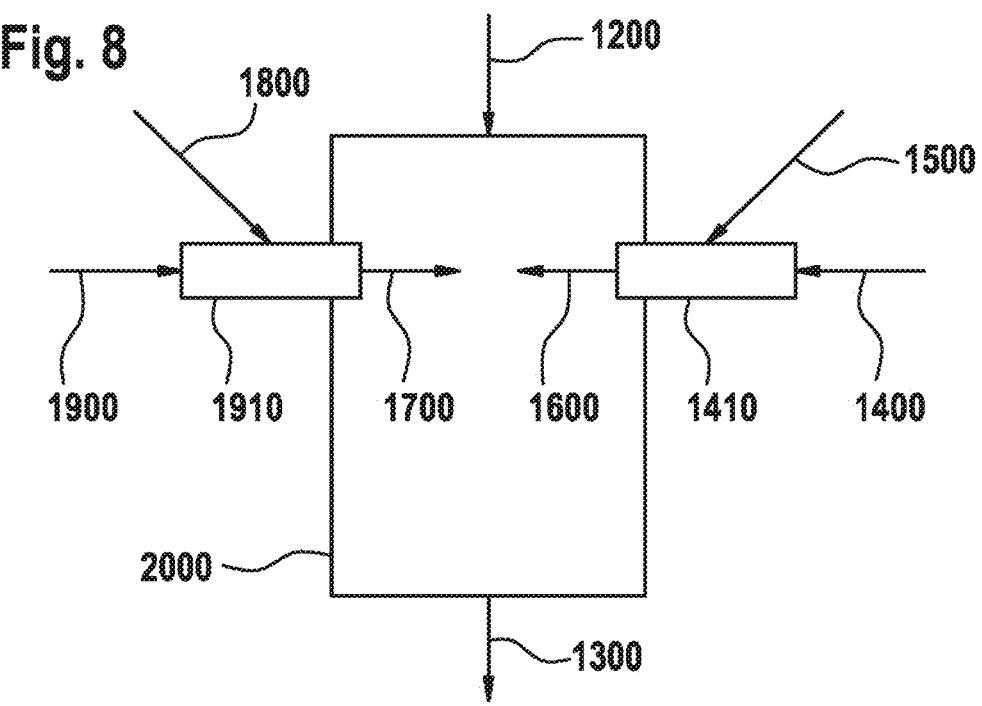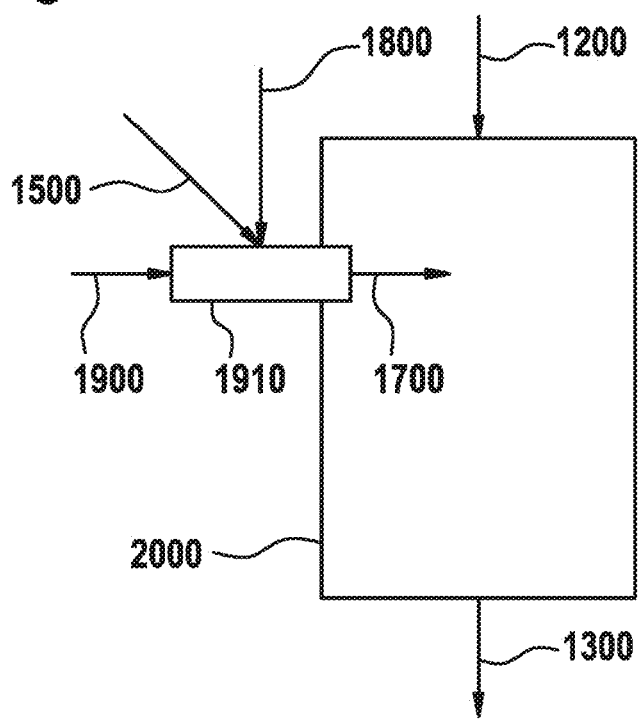

PARTICLE FILTER WITH A PLURALITY OF COATINGS

The present invention relates to a wall-flow filter, to a method for the production and the use of the filter for reducing harmful exhaust gases of an internal combustion engine. The wall-flow filter was produced by exposing the filter at least twice successively to a powder/gas aerosol.

The exhaust gas of internal combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of solid carbon-containing particles and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when combustion temperatures exceed 1200° C. Sulfur oxides result from the combustion of organic sulfur compounds, small amounts of which are always present in non-synthetic fuels. Compliance in the future with statutory exhaust emission limits for motor vehicles applicable in Europe, China, North America, and India requires the extensive removal of said harmful substances from the exhaust gas. For the removal of these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body with a catalytically active coating applied thereto. The catalyst facilitates the chemical reaction of different exhaust gas components, while forming non-hazardous products, such as carbon dioxide, water, and nitrogen.

The flow-through or wall-flow honeycomb bodies just described are also called catalyst supports, carriers, or substrate monoliths, as they carry the catalytically active coating on their surface or in the walls forming this surface. The catalytically active coating is often applied to the catalyst support in the form of a suspension in a so-called coating operation. Many such processes in this respect were published in the past by automotive exhaust-gas catalyst manufacturers (EP1064094B1, EP2521618B1, WO10015573A2, EP1136462B1, U.S. Pat. Nos. 6,478,874 B1, and 4,609,563A, WO9947260A1, JP5378659B2, EP2415522A1, JP2014205108A2).

The operating mode of the internal combustion engine is decisive for the respectively possible methods of harmful substance conversion in the catalyst in each case. Diesel engines are usually operated with excess air, most spark-ignition engines with a stoichiometric mixture of intake air and fuel. "Stoichiometric" means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{L,st}}{m_{L,actual}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

When lean-burn motor vehicle engines are mentioned in the present text, reference is thereby made mainly to diesel engines and to predominantly on average lean-burn spark-ignition engines. The latter are predominantly gasoline engines operated on average with a lean A/F ratio (air/fuel ratio; λ>1). In contrast, most gasoline engines are operated with an on average stoichiometric combustion mixture. In this respect, the expression "on average" takes into consideration the fact that modern gasoline engines are not statically operated with a fixed air/fuel ratio (A/F ratio; λ value). It is rather the case that a mixture with a discontinuous course of the air ratio λ around λ=1.0 is predetermined by the engine control system, resulting in a periodic change of oxidizing and reducing exhaust gas conditions. This change in the air ratio λ is significant for the exhaust gas purification result. To this end, the λ value of the exhaust gas is regulated with a very short cycle time (approx. 0.5 to 5 Hz) and an amplitude Δλ of 0.005≤Δλ≤0.07 around the value λ=1.0. On average, the exhaust gas under such operating states should therefore be described as "on average" stoichiometric. In order to ensure that these deviations do not adversely affect the result of exhaust gas purification when the exhaust gas flows over the three-way catalyst, the oxygen-storing materials contained in the three-way catalyst balance out these deviations by absorbing oxygen from the exhaust gas or releasing it into the exhaust gas as needed (R. Heck et al., Catalytic Air Pollution Control, Commercial Technology, Wiley, 2nd edition 2002, p. 87). However, due to the dynamic mode of operation of the engine in the vehicle, further deviations from this state also occur at times. For example, under extreme acceleration or while coasting, the operating states of the engine, and thus of the exhaust gas, can be adjusted and can, on average, be hypostoichiometric or hyperstoichiometric. However, lean-burn spark-ignition engines have an exhaust gas which is predominantly, i.e., for the majority of the duration of the combustion operation, combusted with an air/fuel ratio that is lean on average.

The harmful gases carbon monoxide and hydrocarbons can be rendered harmless in a lean exhaust gas by oxidation on a suitable oxidation catalyst. In a stoichiometrically operated internal combustion engine, all three harmful gases (HC, CO, and NOx) can be eliminated via a three-way catalyst.

The reduction of nitrogen oxides to nitrogen ("denitrification" of the exhaust gas) is more difficult on account of the high oxygen content of a lean-burn engine. A known method is selective catalytic reduction (SCR) of the nitrogen oxides in a suitable catalyst or SCR catalyst for short. This method is currently preferred for the denitrification of lean-engine exhaust gases. The nitrogen oxides contained in the exhaust gas are reduced in the SCR method with the aid of a reducing agent metered into the exhaust tract from an external source. Ammonia is used as the reducing agent, which converts into nitrogen and water the nitrogen oxides present in the exhaust gas at the SCR catalyst. The ammonia used as reducing agent may be made available by metering an ammonia precursor compound, for example urea, ammonium carbamate, or ammonium formate, into the exhaust tract, and by subsequent hydrolysis.

Diesel particulate filters or gasoline particulate filters with and without additional catalytically active coating are suitable aggregates for removing the particulate emissions. In order to meet the legal standards, it is desirable for current and future applications for the exhaust gas aftertreatment of internal combustion engines to combine particle filters with other catalytically active functionalities not only for reasons of cost but also for installation space reasons. The use of a particle filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of oxidic support materials for the catalytically active noble metals of the catalyst or oxidic catalyst materials are generally applied in smaller quantities in the case of a filter than in the case of a flow-through support. As a result, the catalytic effectiveness of a catalytically coated particle filter is frequently inferior to that of a flow-through monolith of the same dimensions.

There have already been some efforts to provide particle filters which have good catalytic activity due to an active coating and nevertheless have an exhaust-gas back pressure that is as low as possible. On the one hand, it has proven to be advantageous if the catalytically active coating is not present as a layer on the wall of a porous wall-flow filter, but instead the wall of the filter is to be interspersed with the catalytically active material (WO2005016497A1, JPH01-151706, EP1789190B1). For this purpose, the particle size of the catalytic coating is selected such that the particles penetrate into the pores of the wall-flow filters and can be fixed there by calcination.

A further functionality of the filter, which can be improved by a coating, is its filtration efficiency, i.e., the filtering effect itself. WO2011151711A1 describes a method by which a dry aerosol is applied to an uncoated or catalytically coated filter. The aerosol is provided by the distribution of a powdered high-melting metal oxide and is guided through the inlet side of a wall-flow filter by means of a gas stream. In this case, the individual particles having a particle size of 0.2 µm to 5 µm agglomerate to form a bridged network of particles and are deposited as a layer on the surface of the individual inlet channels passing through the wall-flow filter. The typical powder loading of a filter in this case is between 5 g and 50 g per liter of filter volume. It is expressly pointed out that it is not desirable to obtain a coating inside the pores of the wall-flow filter with the metal oxide.

A further method for increasing the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum, or silicon, preferably in fiber form ranging from 1 nm to 5 µm, and have a layer thickness greater than 10 µm, typically 25 µm to 75 µm. After the coating process, the applied powder particles are calcined in a thermal process.

A further method in which a membrane ("trapping layer") is produced on the surfaces of the inlet channels of filters in order to increase the filtration efficiency of catalytically inactive wall-flow filters is described in patent specification U.S. Pat. No. 8,277,880B2. The filtration membrane on the surfaces of the inlet channels is produced by sucking a gas stream loaded with ceramic particles (for example, silicon carbide, cordierite) through. After application of the filter layer, the honeycomb body is fired at temperatures greater than 1000° C. in order to increase the adhesive strength of the powder layer on the channel walls. EP2502661A2 and EP2502662B1 mention further on-wall coatings by powder application.

A coating inside the pores of a wall-flow filter unit by spraying dry particles is described in U.S. Pat. No. 8,388,721 B2. In this case, however, the powder should penetrate deeply into the pores. 20% to 60% of the surface of the wall should remain accessible to soot particles, thus open. Depending on the flow velocity of the powder/gas mixture, a more or less steep powder gradient between the inlet and outlet sides can be adjusted.

The introduction of the powder into the pores, for example by means of an aerosol generator, is also described in EP2727640A1. Here, a non-catalytically coated wall-flow filter is coated using a gas stream containing, for example, aluminum oxide particles in such a way that the complete particles, which have a particle size of 0.1 µm to 5 µm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. They fill in 10% to 50% of the volume of the filled pores in the channel walls. This filter, both loaded with soot and without soot, has an improved filtration efficiency compared to the untreated filter together with a low exhaust-gas back pressure of the soot-loaded filter. Nevertheless, there continues to be a need for particle filters in which the filtration efficiency is optimized with respect to the exhaust-gas back pressure.

EP1576998A2 describes the production of a thin membrane, <5 µm, on the output side of the porous cell wall. The porous membrane is made of nanoparticles having diameters between 20 and 200 nm. In order to fix the membrane on the outlet side of the wall-flow filter, a final calcination takes place here.

U.S. Pat. No. 9,745,227B2 describes the production of an on-wall layer with porous particle agglomerates having a diameter between 10 and 200 µm. These agglomerates, in turn, are produced in a preceding process from particles having dimensions between 0.01 and 5 µm. The applied layer must subsequently be calcined.

WO18115900A1 mentions the oxidic powders of synthetic ash with a d90 of <1 µm. The filters are thus coated in such a way that a packed bed of synthetic ash is formed on the filter walls.

However, there are additional requirements for the particle filter for which solutions are sought. This relates, for example, to improved soot burn-off and the introduction of additional reactive zones for controlling the catalytic reactions.

The object of the present invention is therefore to provide a corresponding, in some cases catalytically active, particle filter in which an adequate filtration efficiency is coupled with the lowest possible increase in the exhaust-gas back pressure. If a catalytic function is present in the filter, it should be sufficiently present. The development and production process should be as robust, cost-effective, and flexible as possible.

These and other objects which are obvious from the prior art are achieved by the specification of a particle filter according to Claims 1 to 14. Claims 15 to 20 are directed at the production of a particle filter according to the invention. Claims 21 and 22 aim at using the particle filter for the exhaust-gas aftertreatment of internal combustion engines.

By providing a wall-flow filter for reducing the harmful substances in the exhaust gas of an internal combustion engine, wherein the dry filter has been exposed in a targeted manner on its inlet surface at least twice successively to different dry powder-gas-aerosols, each of which has at least one high-melting compound, the object posed is extremely successfully achieved.

Figure 2:
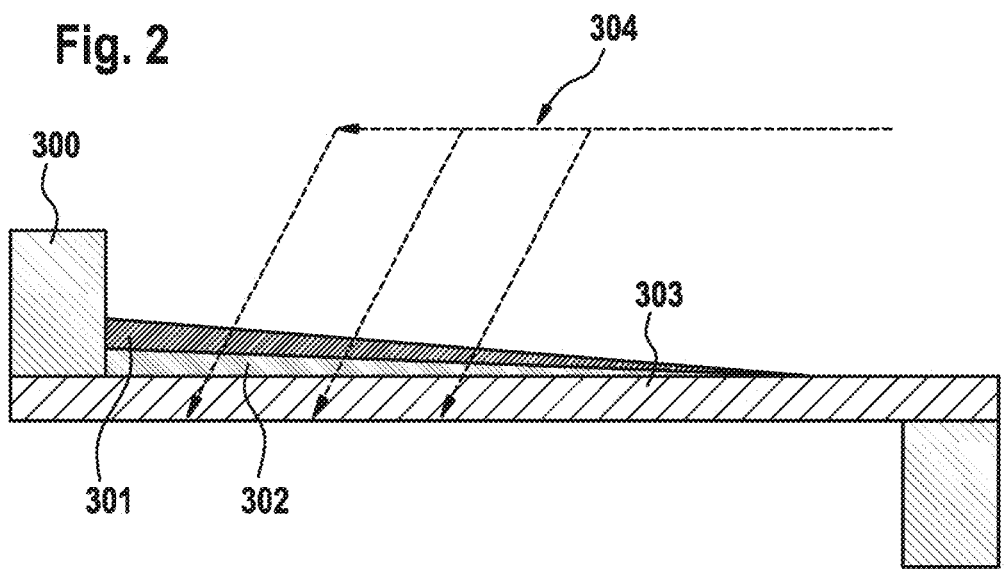
Figure 3:
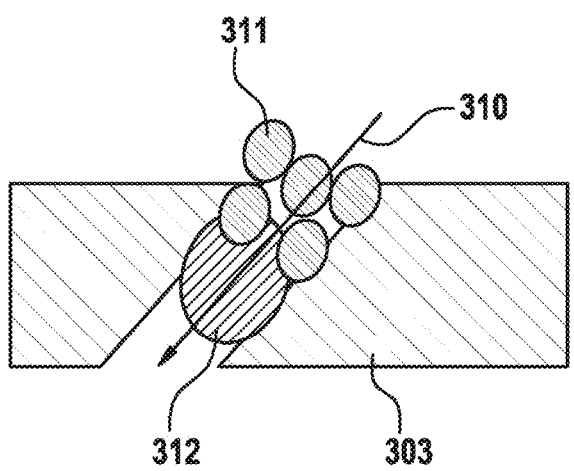

The exposure of the dry, in some cases catalytically coated, filter to the dry powder-gas results in the powder particles, following the stream of the gas, being deposited onto the surface of the inlet side of the filter, and in some cases in the pores of the filter (FIG. 1). According to the invention, this procedure is carried out at least twice successively with different powders in a preferably identical manner, see also FIGS. 6 and 10. A product is thus obtained which, if appropriate, looks as schematically shown in FIGS. 2 and 3, for example. By exposing the filter at least twice to a different powder in each case, the filtration efficiency or the exhaust-gas back pressure of the filter, in concert with any additional catalytic functions, can be adjusted well to the respective conditions in the exhaust tract of an automobile. The development of the designs adapted to the different requirements in each case is cost-effective and flexible because the different layers can be developed separately and can later be combined with one another as required. The production process is also cost-effective, because in the same installation, for example with two and more applicators, several different types of powder, which possibly carry out different functions, can be loaded directly one after the other at an interval of only fractions of a second.

The filters described herein, which in some cases are catalytically coated before and then exposed to powders, differ from those that are produced in the exhaust tract of a vehicle by ash deposition during operation. According to the invention, any catalytically active filters are deliberately powder-sprayed with a specific, dry powder. As a result, the balance between catalysis, filtration efficiency, and exhaust-gas back pressure can be adjusted in a targeted manner right from the start. Wall-flow filters in which undefined ash deposits have resulted from combustion of fuel, e.g., in the cylinder during driving operation or by means of a burner, are therefore not included in the present invention.

Dry in the sense of the present invention accordingly means exclusion of the application of a liquid, in particular water. It is precisely the production of a suspension of the powder in a liquid for spraying into a gas stream that should be avoided. A certain moisture content may possibly be tolerable both for the filter and for the powder, provided that achieving the objective, i.e., the most finely distributed deposition of the powder in or on the inlet surface of the filter possible, is not negatively affected. As a rule, the powder is free-flowing and sprayable by energy input. The moisture content of the powder or of the filter at the time of exposure of the powder should be less than 20%, preferably less than 10%, and very particularly preferably less than 5% (measured at 20° C. and normal pressure, ISO 11465, latest version on the date of application). It is assumed that the dry spraying of sufficiently small powder particles in the dry state will result in the particles not agglomerating.

All ceramic materials customary in the prior art can be used as wall-flow monoliths or wall-flow filters. Porous wall-flow filter substrates made of cordierite, silicon carbide, or aluminum titanate are preferably used. These wall-flow filter substrates have inflow and outflow channels, wherein the respective downstream ends of the inflow channels and the upstream ends of the outflow channels are alternately closed off with gas-tight "plugs." In this case, the exhaust gas that is to be purified and that flows through the filter substrate is forced to pass through the porous wall between the inflow channel and outflow channel, which delivers an excellent particle filtering effect. The filters may be symmetrical or asymmetrical. This means that the inflow channels are either just as large as the outflow channels or else the inflow channels are larger than the outflow channels, i.e., they have a larger so-called "open frontal area" (OFA) than the outflow channels. The filtration property for particulates can be designed by means of porosity, pore/radii distribution, and thickness of the wall. The open porosity of the uncoated wall-flow filters is typically more than 40%, generally from 40% to 75%, particularly from 50% to 70% [measured according to DIN 66133, latest version on the date of application]. The average pore size (mean pore diameter; d50) of the uncoated filters is at least 7 μm, for example from 7 μm to 34 μm, preferably more than 10 μm, in particular more preferably from 10 μm to 25 μm, or very preferably from 15 μm to 20 μm [measured according to DIN 66134, latest version on the date of application]. The completed filters having a mean pore size (d50) of typically 10 μm to 20 μm and a porosity of 50% to 65% are particularly preferred.

The aerosol consisting of the gas and the powder may be produced in accordance with the requirements of the person skilled in the art or according to the invention as outlined further below. For this purpose, a powder is usually mixed with a gas (http://www.tsi.com/Aerosolgeneratoren-und-dispergierer/; https://www.palas.de/de/product/aerosolgeneratorssolidparticles). This mixture of gas and powder produced in this way is then advantageously fed into the inlet side of the wall-flow filter via a gas stream. The term "inlet side" refers to the part of the filter formed by the inflow channels/inlet channels. The inlet surface is formed by the wall surfaces of the inflow channels/inlet channels on the inlet side of the wall-flow filter. The same applies mutatis mutandis to the outlet side.

All gases considered by the person skilled in the art for the present purpose can be used as gases for producing the aerosol and for inputting into the filter. The use of air is very particularly preferred. However, it is also possible to use other reaction gases which can develop either an oxidizing (e.g., $O_2$, $NO_2$) or a reducing (e.g., $H_2$) activity with respect to the powder used. With certain powders, the use of inert gases (e.g., $N_2$) or noble gases (e.g., He) may also prove advantageous. Mixtures of the listed gases are also conceivable.

In a preferred embodiment, the filter may have been catalytically coated prior to the first exposure to the powder/gas aerosol. Here, catalytic coating is understood to mean the ability to convert harmful constituents of the exhaust gas from internal combustion engines into less harmful ones. The exhaust gas constituents NOx, CO, and HC and particles should be mentioned here in particular. This catalytic activity is provided according to the requirements of the person skilled in the art by a coating of the wall-flow filter with a catalytically active material. The term "coating" is accordingly to be understood to mean the application of catalytically active materials to the wall-flow filter. In this case, the coating can be applied either into the porous filter wall or onto the same. In the latter case, both the inlet and the outlet channels can accordingly be coated in zones in some cases. The coating assumes the actual catalytic function. In the present case, the coating is carried out by applying a correspondingly low-viscosity aqueous suspension, also called washcoat, or solution of the catalytically active components to the wall-flow filter, see, for example, according to EP1789190B1. After application of the suspension/solution, the wall-flow filter is dried and, if applicable, calcined at an increased temperature. The catalytically coated filter preferably has a loading of 20 g/l to 200 g/l, preferably 25 g/l to 150 g/l. The most suitable amount of loading of a filter coated in the wall depends on its cell density, its wall thickness, and the porosity. In the case of common medium-porous filters (<60% porosity) with, for example, 200 cpsi cell density and 8 mil wall thickness, the preferred loading is 20 g/l to 50 g/l (based on the outer volume of the filter substrate). Highly porous filters (>60% porosity) with, for example, 300 cpsi and 8 mil have a preferred amount of loading of 25 g/l to 150 g/l, particularly preferably 50 g/l to 100 g/l.

In principle, all coatings known to the person skilled in the art for the automotive exhaust-gas field are suitable for the present invention. The catalytic coating of the filter may preferably be selected from the group consisting of three-way catalyst, SCR catalyst, nitrogen oxide storage catalyst, oxidation catalyst, soot-ignition coating. With regard to the individual catalytic activities coming into consideration and their explanation, reference is made to the statements in WO2011151711A1. Particularly preferably, this has a catalytically active coating having at least one component selected from the group consisting of metal-ion-exchanged zeolites, cerium/zirconium mixed oxide, aluminum oxide, and palladium, rhodium, or platinum, or combinations of these noble metals.

In a further preferred embodiment, the wall-flow filter is exposed to a first powder/gas aerosol in such a way that the powder precipitates in the pores of the filter walls during the first exposure and at least fills them up to the inlet surface and thereby forms no cohesive layer on the walls of the filter over the entire length of the filter (FIG. 1). By deposition of the powder in the pores of the walls of the wall-flow filter, formation of a layer of the powder on the inlet surface of the filter can be prevented. For this purpose, a certain amount of powder should not be exceeded during the exposure. Otherwise, the pores would fill up according to the invention and all further material would then only be able to deposit on the channel walls of the wall-flow filter. In the context of the invention, the feature of the absence of a cohesive powder layer on the walls of the filter is therefore to be understood to mean that there is at least no completely continuous layer of powder on the inlet surfaces of the filter (FIG. 1). Advantageously, in a top view of the filter wall, less than 60%, more preferably <70%, and very preferably <80% appears to be covered with powder. An optical analysis of the inlet surface can be used for this evaluation. If not only the pores are to be filled, but an on-wall layer (powder deposition on the inlet surface in the form of a layer) is also desired, then the use of highly porous powders, such as the pyrogenic oxides, is preferred in order not to increase the pressure loss too much.

The amount of first powder depends on the type of powder and the volume of the available pores and can be determined by the person skilled in the art in preliminary experiments under the given boundary conditions (exhaust-gas back pressure not too high). As a rule, the loading of the filter with the powder is no more than 50 g/l based on the filter volume. The value is preferably not more than 20 g/l, very particularly preferably not more than 10 g/l. A lower limit is naturally formed by the desired increase in filtration efficiency. When the first powder deposit is formed from pyrogenic powders, amounts of <5 g/l, more preferably <3 g/l, and very preferably <2 g/l are possible.

According to the invention, at least one second powder layer is advantageously deposited in the same way on the first powder layer, which is either exclusively applied in the pores of the wall-flow filter as just described as advantageous and/or onto the inlet surface of the inlet side of the filter. The total amount of powder deposited in the wall-flow filter should advantageously ultimately be dimensioned in such a way that the exhaust-gas back pressure is still within the regions acceptable for the field of application. The total amount of powder remaining in the filter is generally below 100 g/l, preferably up to 80 g/l, and preferably up to 70 g/l, very preferably <50 g/l.

The first powder differs from the second one in its physical parameters (particle size, degree of crosslinking, outer surface that can be flowed around, inner surface, grain shape, and tamped density) and/or in its chemical composition. For example, one of the applied powders can possess catalytic activity and/or be covered with catalytically active further substances (FIGS. 2 and 3). Preferably, at least one of the powders, in the case of two powders preferably only the second one, is likewise catalytically active with regard to reducing the harmful substances in the exhaust gas of an internal combustion engine. Reference is made in this respect to the catalytic activities addressed further to the rear. In addition to the catalytic functions, the first or further powder may also have the following functions:

Collection of functional particles

Adhesion promoter for functional particles

Increase of filtration efficiency,

Storage of exhaust gas components

Separating layer, for example as protection against cross-contamination

Change in local permeability of the filter

The powder or powders can serve as collection material for functional particles (e.g., catalytically coated particles) which are not completely or only partially filtered out of the gas stream by the pores of the substrate. Materials with a high filtration effect and a low pressure loss (see also FIG. 4 to FIG. 6 and FIG. 11) would be suitable for this purpose. Mention may be made here, for example, of pyrogenically produced oxides. These are particularly suitable as first powders, in particular, because they have their own very low density (e.g., tamped density<100 kg/m$^3$) and high porosity of >90%, into which other particles can be incorporated.

The powder or powders serve to increase filtration efficiency. Materials with a high filtration effect and at the same time low pressure loss are preferably used for this purpose. For this purpose, a sufficiently flowed-around outer surface is advantageous. Preferably, the entire outer surface of the powder used in and/or on the filter walls, as the case may be, should be greater than 5 m$^2$ per liter, preferably greater than 10 m$^2$, and very preferably greater than 15 m$^2$ based on the outer flowed-through filter volume in liters. These values apply to non-pyrogenically produced high-melting compounds, in particular to oxides. In the advantageous use of commercially available non-pyrogenic oxides as, for example, a second powder on a first pyrogenic powder layer, the outer surface of the entire powder coating is increased to over 800 m$^2$, preferably 600 m$^2$, and very preferably 400 m$^2$ based on the outer flowed-through filter volume in liters. In the advantageous use of pyrogenic oxides as the second powder on a first pyrogenic powder layer, the outer surface even increases to over 1000 m$^2$, preferably 600 m$^2$, and very preferably 500 m$^2$ based on the outer flowed-through filter volume in liters.

The total surface area or outer surface of the particles SV flowed around is obtained from the particle size x according to:

$$S_V[m^{-1}] = 6 \cdot \int_{x\_min}^{x\_max} x_i^{-1} \cdot q_0(x_i) \cdot dx = 6 \cdot \sum_{min}^{max} \frac{\Delta Q_3(x_i)}{x_i}$$

(M. Stieß, Mechanische Verfahrenstechnik-Partikeltechnologie 1 [Mechanical Process Engineering—Particle Technology 1], Springer, 3rd edition 2009, page 35), and the mass-related surface (M. Stieß, Mechanische Verfahrenstechnik-Partikeltechnologie 1, Springer, 3rd edition 2009, page 16) is obtained therefrom with the density of the particles ρ:

$$S_m\left[\frac{m^2}{kg}\right] = \frac{S_V}{\rho_{particles}}$$

outer surface of the powder $S_{outer}[m^2] = S_m \cdot m_{powder}$

The powder or powders can, for example, preferably serve as separating layers between 2 functional units, such as between filter wall coated with catalytic washcoat and catalytically active powder, in order to inter alia avoid cross-contaminations. The powder or powders can also serve as storage components. Especially during a cold start, exhaust gas components, in particular NOx and/or HC, could be temporarily stored here until the catalyst becomes active.

The powder or powders can be used in particular for the conscious modification of the permeability in order to allow a different type of flow through the catalytic layers. In particular in the case of filters according to the invention having an originally uniform permeability along the flow axis, the filter then advantageously has an increasing gradient with regard to the concentration of the powder in the longitudinal direction of the filter from the inlet side to the outlet side (e.g., FIG. 2). This gradient can be adjusted and also varied by selected parameters. According to the invention, the term "increasing gradient" refers to the fact that the gradient of the powder concentration in the filter increases in the axial direction, from the inlet side to the outlet side, possibly changing from negative values to more positive values. In a preferred embodiment, there is more powder in the vicinity of the outlet plugs of the inlet channel and significantly less powder at the inlet of the filter.

In order to describe the gradient, the filter is divided into three successive sections of equal length with a uniform permeability along its longitudinal axis. In a preferred form, the filter is coated in a region near the inlet side and in a region in the center of the filter with respectively less than 40% of the total amount of powder, while more than 40% of the total amount of powder of the inlet channel is present in a region near the outlet side, wherein in a particularly preferred form, between 5% and 35% of the total amount of powder is present in a region near the inlet side, between 8% and 38% is present in a region in the center of the filter, and between 40% and 60% is present in a region near the outlet side. In a very particularly preferred form, the amount of powder in a region near the inlet side is between 5% and 25% of the total amount of powder, in a region in the center of the filter between 8% and 30%, and in a region near the outlet side between 45% and 60%. The amount of powder in the three regions can be determined, for example, by weighing or optical evaluation of the on-wall photos.

The gradient formed in the powder coating according to the invention on a filter having a more uniform permeability is advantageous for a further increased filtration efficiency.

In a likewise advantageous embodiment, the concentration gradient can be designed, for example, by varying the spraying rate, such that more powder is deposited on the filter at the inlet side than in the center of the filter, and at the outlet side (at the other end of the filter) more than at the inlet side. An increased application of a powder coating on the last third of the filter additionally increases the back pressure there, this being due to a lower permeability, and the throughflow shifts more into the first two thirds of the filter. The powder-coated filter should therefore preferably have a more rapidly increasing gradient of the powder coating, as viewed from the inlet to the output, in order to increase its filtration effect. This applies mutatis mutandis to the adjustment of an advantageous exhaust-gas back pressure. Accordingly, if necessary, a gradient of the concentration of the powder that increases less rapidly should be adjusted here.

In the case of filters having an inhomogeneous distribution of permeability, as a result of zones of a catalytic coating applied to the cell wall or
zones having different amounts of catalytically active coating applied in the cell wall or
filter substrates with different permeabilities, the gas stream is naturally guided differently. The advantage of the powder coating is then that the particles also follow the gas stream there and are deposited where the later exhaust gas stream would flow. In this way, larger "holes" are effectively "plugged."

Furthermore, a preferred embodiment of the powder coating is characterized in that when filter substrates with square channels are used, the total powder coating in the corners of the channels is thicker than in the corresponding center of the inlet surface. With exhaust-gas back pressure not increasing excessively, this has a further improved effect on the filtration efficiency. The term "the corresponding center" refers to the place in the center of the inlet channel between the corners of the channels, which has the same distance to the inlet end in the axial direction as the corresponding place in the corners of the channels. The quantities are preferably determined here by means of optical evaluation of the on-wall photos.

Powders which are preferably used in the present invention for producing the aerosol are sufficiently familiar to the person skilled in the art. These are generally high-melting metal compounds, which are commonly used as support materials for catalysts in the automotive exhaust-gas field. Corresponding metal oxide, metal sulfate, metal phosphate, metal carbonate, or metal hydroxide powders or their mixtures are preferably used. Possible metals for the metal compounds are in particular those selected from the group of alkali metals, alkaline earth metals or earth metals, or transition metals. Such metals selected from the group of calcium, magnesium, strontium, barium, aluminum, silicon, titanium, zirconium, cerium are preferably used. As stated, these metals can preferably be used as oxides. Very particular preference is given to the use of cerium oxide, titanium dioxide, zirconium dioxide, silicon dioxide, aluminum oxide, iron oxide, zinc oxide, or mixtures or mixed oxides thereof. Very particular preference is given to the use of an aerosol which is a mixture of air and one of these metal oxide powders. Here, the term "mixed oxide" (solid solutions of a metal oxide in at least one other) is also understood to mean the use of zeolites and zeotypes. In the context of the invention, zeolites and zeotypes are defined as in WO2015049110A1.

These powders may in some cases be pyrogenically produced powders. In general, pyrogenically produced metal oxide powders are understood to be those obtained by flame hydrolysis or flame oxidation from a metal oxide precursor in an oxyhydrogen gas flame (https://de.wikipedia.org/w/index.php?title=Pyrogenes_Siliciumdioxid&oldid=182147815; Pater Albers et al. Chemie in unserer Zeit [Chemistry in our Time], 2016, 50, 162-171; Hans Ferkel et al. MTZ—Motortechnische Zeitschrift [Engine Technology Magazine, 2010, 71, 128-133]. These have properties as described for flame-synthesized particulate products in the following references, Gutsch et al. (2002) KONA (no. 20); Li S. et al. (2016) Progress in Energy and Combustion Science (55); Ulrich G. (1971) Combustion Science and Technology (vol. 4). Such pyrogenic methods have already been established on an industrial level since 1944, for example, in Degussa AG. For example, the company Evonik sells pyrogenic silicic acid under the name Aerosil® or pyrogenic aluminum oxide under the name Aeroxide®. The first patents for this originate from the years 1931 to 1954 (U.S. Pat. Nos. 1,967,235A, 2,488,440A, DE948415C, DE952891C).

In general, this method makes it possible to produce high-surface-area compounds, in particular oxides of various metals having very low tamped density<100 kg/m$^3$, preferably <80 kg/m$^3$, and very preferably <60 kg/m$^3$ (measured according to the standard DIN EN ISO 787-11, latest version on the date of application). The porosity of these pyrogenic metal oxides is >90%, preferably >93%, and very preferably >95%. This is determined from the ratio of the tamped density to the primary particle density or the true non-porous density (https://de.wikipedia.org/w/index.php?title=Reindichte&oldid=164022376) of the respective oxides. The formula is:

Porosity=1−tamped density/true density

For the example of aluminum oxide, the true density is 3200 to 3600 kg/m$^3$, and the tamped density of the pyrogenic oxides is only about 50 kg/m$^3$. Thus, 1 m$^3$ of the powder contains only about 1.5% of aluminum oxide.

According to the invention, the powders can be used as such as described above. However, the use of dry powder as the first, second, and/or further powder which supports a catalytic activity with regard to exhaust-gas aftertreatment is also conceivable. Accordingly, the powder itself can likewise be catalytically active with regard to reducing harmful substances in the exhaust gas of an internal combustion engine. Suitable for this purpose are all activities known to the person skilled in the art, such as TWC, DOC, SCR, LNT, or soot-burn-off-accelerating catalysts. The powder generally has the same catalytic activity as any catalytic coating of the filter that may have been applied. This further increases the overall catalytic activity of the filter as compared to filters not coated with catalytically active powder. In this respect, it may be possible to use aluminum oxide, for example, impregnated with a noble metal for producing the powder/gas aerosol. Three-way activity with a coating comprising palladium and rhodium and an oxygen-storing material, such as cerium zirconium oxide, are preferred in this connection. It is likewise conceivable for catalytically active material to be used for the SCR reaction. Here, the powder may consist, for example, of zeolites or zeotypes exchanged with transition metal ions. Very particular preference is given in this context to the use of zeolites exchanged with iron and/or copper. CuCHA (copper-exchanged chabazite; http://europe.iza-structure.org/IZA-SC/framework.php?STC=CHA) or CuAEI (http://europe.iza-structure.org/IZA-SC/framework.php?STC=AEI) are extremely preferably used as material for producing the powder/gas aerosol.

An activity of the powder may also advantageously be improved soot combustion. In this case, a powder consisting, for example, of an aluminum oxide impregnated with one or more noble metals is particularly preferred. Preferred noble metals in this case are platinum, palladium, rhodium, or mixtures thereof. Particularly preferred is an aluminum oxide impregnated with platinum and palladium. Further materials catalyzing soot burn-off are pure or doped cerium oxides and/or cerium/zirconium mixed oxides. Dopants known to the person skilled in the art can be present in the aforementioned oxides. These are elements from the group of rare earth metals, such as lanthanum, yttrium, neodymium, praseodymium. Further known elements catalyzing soot burn-off are derived from the group of alkali metals, alkaline earth metals, and transition metals, such as magnesium, calcium, iron, copper, manganese. These can be applied to the filter either directly in powder form, for example as sulfate, carbonate, or analogous compounds, or as a composite in conjunction with aluminum oxide, cerium oxide, and/or cerium/zirconium mixed oxide.

Very particular preference is given to an embodiment in which the first powder has no catalytic activity, but the second one does. For example, on a filter provided with a three-way catalytic coating, a first powder without catalytic activity and then a second powder with a soot-ignition coating may be applied. In an advantageous embodiment, if at least one of the powders carries a catalytic activity as just described, this powder or these powders should be distributed in the filter such that it has a catalytically active powder zone in the last third of the filter in the inlet channel.

The particle diameters of the first powder should be selected such that, after they have been dispersed in the gas, they do not or only minimally penetrate through the pores of the filter during coating. This is generally ensured if the d50 of the particles or particle agglomerates ($Q_3$ distribution; measured with the Tornado dry dispersion module of the company Beckmann according to the latest ISO 13320-1 on the date of application) is >1/10, preferably >1/5, of the mean pore diameter (d50; DIN 66134, latest version on the date of application) of the filter. Particles having a diameter of d50>1/2 of the mean pore diameter predominantly already form an on-wall layer and do not penetrate. The upper limit of the ratio of particle diameter (d50) to mean pore diameter is generally <4, preferably <3, and very preferably <2. The powders for the first coating should have a very low tamped density of <200 kg/m$^3$, preferably less than 150 kg/m$^3$, particularly preferably <100 kg/m$^3$.

The particle or particle agglomerate diameter (d50−$Q_3$ distribution; measured with the Tornado dry dispersion module of the company Beckmann according to the latest ISO 13320-1 on the date of application) of the following powders can be significantly less than 1/10, preferably <1/20 of the mean pore diameter (d50; DIN 66134, latest version on the date of application) of the filter. If in some cases closed coatings are achieved on the filter wall with the powder in a larger region of the filter, the powder should also have a very low tamped density of <200 kg/m$^3$, preferably less than 150 kg/m$^3$, particularly preferably <100 kg/m$^3$, here. However, in the case of a non-closed coating on the filter wall, the tamped density may even be from 500 kg/m$^3$ to 1300 kg/m$^3$.

The wall-flow filter produced according to the invention exhibits an excellent filtration efficiency with only a moderate increase in exhaust-gas back pressure as compared to a corresponding wall-flow filter in the fresh state that has not been exposed to powder. The wall-flow filter according to the invention preferably exhibits an increase in filtration efficiency for washcoat-free, raw filter substrate of at least 5%, preferably at least 7%, and very particularly preferably at least 10%, at a relative increase in the exhaust-gas back pressure of the fresh wall-flow filter of at most 5%, preferably at most 4%, and very particularly preferably at most 3%, as compared to a fresh raw filter not treated with powder. Particularly advantageous is an improvement in filtration efficiency of at least 10% with a maximum back pressure increase of at most 5%. The wall-flow filter according to the invention preferably exhibits an increase in filtration efficiency for a filter substrate previously pre-coated with washcoat of at least 15%, preferably at least 25%, and very particularly preferably at least 35%, at a relative increase in the exhaust-gas back pressure of the fresh wall-flow filter of at most 20%, preferably at most 15%, and very particularly preferably at most 12%, as compared to a fresh filter previously coated with washcoat but not treated with powder. Particularly advantageous is an improvement in filtration efficiency of at least 30% with a maximum back pressure increase of at most 10%.

The present invention also provides a method for producing a wall-flow filter according to the invention. In principle, the person skilled in the art knows how to produce an aerosol from a powder and a gas in order to then guide the aerosol through the filter which is to be exposed to the powder. According to the invention, in order to produce a wall-flow filter for reducing the harmful substances in the exhaust gas of an internal combustion engine, a dry filter is exposed in a targeted manner on its inlet surface at least twice successively to different dry powder-gas-aerosols, each of which has at least one high-melting compound, by sequentially dispersing the powders one after the other in the gas, then conducting them into a gas stream, and sucking them into the inlet side of the filter without further supply of a gas.

In this case, the at least two powders are deposited on the inlet surface of the filter or in its pores. As described above as advantageous, a concentration gradient of the powder over the axial length of the carrier can be adjusted, for example, by using different flow breakers in the aerosol gas stream upstream of the inlet side of the carrier and also by adjusting the coating parameters, such as the flow velocity of the carrier gas and atomizer gas.

Even the physical parameters of the powders used, such as the bulk density, residual moisture content, and particle size distribution, can be used in a targeted manner to create the desired gradient described above. Addition may be continuous until the sufficient amount of powder is deposited in the filter. A pulsed addition is also possible such that the powder charged with compressed gas is metered periodically into the gas stream sucked through the filter until the sufficient amount of powder has been deposited in the filter. The powder can be injected not only continuously or in a pulsating manner into a gas stream flowing permanently through the filter but can also be sprayed beforehand into a separate buffer chamber. After the powder has been sprayed, a flap opens to a chamber in which the substrate is clamped. The gas/powder mixture can then be introduced from the buffer chamber into the substrate by a suction pulse. Depending on the amount of powder to be introduced into the substrate, this process can be repeated as often as desired. Apparatuses and methods for which such a metering of a powder is described are appreciated in the prior art (DE4225970C1, U.S. Pat. Nos. 8,495,968B2, 8,632,852B2, 8,534,221B2, 8,277,880B2, see also above).

In order for the powder to be deposited sufficiently well on the surface of the filter wall on the inlet side of the filter, a certain suction power is needed. In orientation experiments for the respective filter and the respective powder, the person skilled in the art can form an idea for himself in this respect. It has been found that the aerosol (powder/gas mixture) is preferably sucked through the filter at a velocity of 5 m/s to 60 m/s, more preferably 10 m/s to 50 m/s, and very particularly preferably 15 m/s to 40 m/s. This likewise achieves an advantageous adhesion of the applied powder.

As already described, the first, second, and in some cases any further powders are converted into an aerosol. This can be done according to the requirements of the person skilled in the art (EP2371451B1; EP2371452B1; EP2388072A1). The dispersion of the powder in the gas can take place in various ways. Preferably, the dispersion of the powder is generated by at least one of the following measures:

Dispersion by means of compressed air
Dispersion by ultrasound
Dispersion by sieving
Dispersion by "in-situ milling"
Dispersion by a blower
Dispersion by means of expansion of gases
Dispersion in the fluidized bed.

This mixture of gas and powder thus produced is then first introduced into an existing gas stream which carries the finely distributed powder into the inlet side of the wall-flow filter. This process is assisted by a suction device which is positioned in the pipeline downstream of the filter. This is in contrast to the device shown in FIG. 3 of U.S. Pat. No. 8,277,880B, in which the powder/gas aerosol is produced directly in the gas stream. The method according to the invention allows a much more uniform and good mixing of the gas stream with the powder/gas aerosol, which ultimately ensures an advantageous distribution of the powder particles in the filter in the radial and axial direction and thus helps to make uniform and control the deposition of the powder particles on the inlet surface of the filter.

Advantageous methods for producing the powder/gas aerosol were already mentioned above. In principle, the person skilled in the art is free to select a method for producing the powder/gas aerosol. For example, the dispersion methods mentioned below for producing an aerosol are advantageous.

Dispersion with Compressed Air:

The production of powder/gas aerosols by means of compressed air is sufficiently known to the person skilled in the art. By way of example, such powder/gas mixtures are used in inhalers or powder fire extinguishers and in sandblasting blowers, for example described in US108408. In principle, the mixtures are produced here with the aid of pressure, in particular compressed air. Dispersion can occur due to flow stresses (acceleration flow, shear field, turbulent flow). The dispersion energy is determined by the gas velocity, which is a function of the applied pressure and the nozzle diameter. Such apparatuses can also be found in US20010003351A1 or U.S. Pat. No. 6,220,791B1 and literature cited therein.

Dispersion by Ultrasound:

The production of a defined particle size distribution in the gas phase can also be effected by an ultrasonic field with advancing or standing wave. WO05022667A2 describes the dispersion of powder in an ultrasonic field. The addition of the powder to the ultrasonic field can be accomplished here by addition into a sieve located in the ultrasonic field, by a predispersed introduction with the aid of a sieve in a free fall or by an air stream.

Dispersion by Sieving:

The powder can be dispersed with the aid of an air jet sieve (DE102010015364A1; DE19921409A1 and literature cited therein) and/or an ultrasonic sieve. The powder can be deagglomerated by means of an ultrasonic sieve base (US sieve) placed above the air inlet. In a US sieve, the sieve grating oscillates at a frequency in the kHz range. The amplitudes in this case lie in the μm range. As a result of the movement of the sieve grating, impact is exerted by the sieve grating on the agglomerates placed on the sieve. This stress leads to deagglomeration. The dispersion energy is determined by the kinetic energy of the sieve grating, which is a function of the amplitude and the oscillation frequency. After the stress, the deagglomerated particles fall through the sieve base and are fed to the gas stream.

Dispersion by "In-Situ Milling":

The powder can be dispersed, for example, in a jet mill. A plurality of nozzles is arranged tangentially in a milling chamber, wherein the nozzles can be operated critically (with supersonic flow). The powder is metered into the milling chamber and accelerated in the gas streams. The dispersion takes place on the basis of particle-particle impacts. The dispersion energy is mainly determined by the collision velocity of the agglomerates. The advantage of this mill is the low tendency to contaminate the particulate material with material from the mill since the comminution takes place by particle-particle interactions.

The powder can also be dispersed in a pin mill if the hardness of the powder allows. The powder is added to the milling chamber in which a disk is rotated on which metallic milling pins are mounted. In this case, deagglomeration is caused by the collision of the agglomerates with the pins. The dispersion energy is determined here by the circumferential speed (rotational speed×disk diameter). A prerequisite for the collision with the milling pins is a sufficient inertia of the agglomerates, which can be described by the Stokes number/inertia parameters for the collision conditions.

With a corresponding selection of the operating parameters, similar dispersion energies are achieved in both mills. The variable operating parameter in the jet mill is the impaction velocity of the particles, which is regulated via the nozzle pilot pressure. In the pin mill, the variable operating parameter is the rotational speed. Even a dynamic classifier could be used for powders that are very easy to disperse. The dispersion works according to the same principle as in a pin mill. In addition to dispersing through the collision with the classifier vanes, classification of the agglomerates takes place based on the flow guidance. Agglomerates with a size above the parting particle remain in the open space. The dispersion energy is determined by the circumferential speed of the classifier wheel. A prerequisite for the collision with the classifier blades is a sufficient inertia of the agglomerates, which is described by the Stokes number/inertia parameters for the collision conditions (flow conditions and geometry of the blades).

Dispersion by Blower:

In this embodiment, the powder is metered into a blower. In the blower, the agglomerates collide with the rotors, as a result of which the powder is stressed, which leads to dispersion. The dispersion energy is determined here by the circumferential speed (rotational speed×rotor diameter) and the radial point of incidence on the rotors. A prerequisite for the collision with the rotor blades is a sufficient inertia of the agglomerates, which is described by the Stokes number/inertia parameters for the collision conditions. In addition to the collision stress, due to the velocity gradients and turbulences in the apparatuses, flow stresses act, which likewise lead to dispersion. The dispersion energy caused by the flow stresses is determined by the circumferential speed and rotor design. The inertia of the particles is insignificant for the dispersion in the generated flow field.

Dispersion by Expansion:

Particles in the gas phase can also be dispersed by depressurizing the aerosol, which is in an overpressure, via a nozzle. The dispersion takes place as a result of shearing and acceleration forces in the gas stream, wherein the dispersion energy is determined by the applied pressure difference. Furthermore, a supercritical pressure ratio can be adjusted. When the critical pressure ratio is exceeded, a supersonic flow develops downstream of the nozzle. In the case of supercritical expansion, shock waves form in which additional stresses act on the agglomerates, as a result of which dispersion is likewise achieved.

Dispersion by Fluidized Bed

In this embodiment, the powder is placed in a fluidized bed and dispersed when flowed through with gas. In this case, the dispersion is caused by particle-particle impacts. The dispersion energy is determined by the relative velocity of the particles, wherein the relative velocity of the particles is generated by the gas flowing through. Furthermore, larger spheres can be added to the fluidized bed and serve as an impacting object, the dispersion then being determined by the relative velocity of the sphere particles. Moreover, additional nozzles from which gas flows out at high velocities can be arranged in the fluidized bed, wherein various arrangements are possible. This is known to the person skilled in the art as fluidized-bed jet milling. Also taken into account in this connection are additional solid build-in components which serve as an impacting surface, which is referred to as jet impactor-assisted fluidized bed.

Further dispersion methods not mentioned here can likewise be used by the person skilled in the art. As already described, the powder is first converted by dispersion into a powder/gas aerosol and then guided into a gas stream. The gas stream then carries the finely distributed powder into the inlet side of the wall-flow filter. The powder is then deposited according to the invention. The powder is dry when the wall-flow filter is exposed in the sense of the invention. The powder is preferably mixed with ambient air where applicable and applied to the filter. Without being bound by any particular theory, it is assumed that this manner of application of the powder counteracts caking or agglomeration of the individual powder constituents prior to their deposition. This preserves the original particle size of the powder particles in the aerosol. In this way, it is then possible, if desired, to deposit the powder particles also in the wall pores of the wall-flow filter and not, as described in the prior art, through the pores and onto the walls of the inlet surface. The second and any further powders are then applied in the same way and then deposit on the first powder.

In a preferred embodiment of the method according to the invention, at least one partial gas stream is extracted downstream of the suction device and, before the powder addition, is added back to the gas stream which has been drawn through the filter. The powder is thereby metered into an already heated air stream. The suction blowers for the necessary pressures generate approximately 70° C. exhaust air temperature since the installed suction power is preferably >20 kW. In an energetically optimized manner, the waste heat of the suction blower is used to heat the supply air in order to reduce the relative humidity of the supply air. This in turn reduces the adhesion of the particles to one another and to the inlet plugs. The deposition process of the powder can thus be better controlled.

In the present method for producing a wall-flow filter, a gas stream is charged with a powder/gas aerosol and sucked into a filter. This ensures that the powder can be distributed sufficiently well in the gas stream for it to be able to penetrate into the inlet channels of the filter on the inlet side of the wall-flow filter. Homogeneous mixing of the powder in the gas/air requires intensive mixing. For this purpose, diffusers, venturi mixers, and static mixers are known to the person skilled in the art. Particularly suitable for the powder coating process are mixing devices which avoid powder deposits. Diffusers and venturi tubes are thus preferably used for this process. The introduction of the dispersed powder into a fast-rotating rotating flow with a high turbulence has also proven effective.

In order to achieve an advantageously uniform distribution of the powder over the cross section of the filter, the gas transporting the powder should have a piston flow (if possible, the same velocity over the cross section) when impinging on the filter. This is preferably adjusted by an accelerated flow upstream of the filter. As is known to the person skilled in the art, a continuous reduction of the cross section without abrupt changes causes such an accelerated flow, described by the continuity equation. Furthermore, it is also known to the person skilled in the art that the flow profile is thus more closely approximated to a piston profile. For the targeted change of the flow, built-in components, such as sieves, rings, disks, etc., can be used below and/or above the filter.

In a further advantageous embodiment of the present invention, the apparatus for powder coating has one or more devices (turbulators, vortex generators) with which the gas stream carrying the powder/gas aerosol can be vortexed prior to impingement on the filter. As an example in this respect, corresponding sieves or grids can be used, which are placed at a sufficient distance upstream of the filter. The distance should not be too large or small so that sufficient vortexing of the gas stream directly upstream of the filter is achieved. The person skilled in the art can determine the distance in simple experiments. The advantage of this measure is explained by the fact that powder constituents do not deposit on the inlet plugs of the outlet channels and all the powder can penetrate into the inlet channels. Accordingly, it is preferred according to the invention if the powder is vortexed before flowing into the filter in such a way that deposits of powder on the inlet plugs of the wall-flow filter are avoided as far as possible. A turbulator or turbulence generator or vortex generator in aerodynamics refers to equipment which causes an artificial disturbance of the flow. As is known to the person skilled in the art, vortices (in particular microvortices) form behind rods, gratings, and other flow-interfering built-in components at corresponding Re numbers. Known are the Karman vortex street (H. Benard, C. R. Acad. Sci. Paris. Ser. IV 147, 839 (1908); 147, 970 (1908); T. von Karman, Nachr. Ges. Wiss. Göttingen, Math. Phys. Kl. 509 (1911); 547 (1912)) and the wake turbulence behind airplanes which can cover roofs. In the case according to the invention, this effect can be intensified very particularly advantageously by vibrating self-cleaning sieves (so-called ultrasonic screens) which advantageously move in the flow. Another method is the disturbance of the flow through sound fields, which excites the flow to turbulences as a result of the pressure amplitudes. These sound fields can even clean the surface of the filter without flow. The frequencies may range from ultrasound to infrasound. The latter measures are also used for pipe cleaning in large-scale technical plants.

The present invention also relates to the use of a wall-flow filter according to the invention for reducing harmful exhaust gases of an internal combustion engine. In principle, all catalytic exhaust-gas aftertreatments (see above) coming into consideration for this purpose to the person skilled in the art and using a filter can serve for application purposes, but in particular those in which the filter is in an exhaust system together with one or more catalytically active aggregates selected from the group consisting of nitrogen oxide storage catalysts, SCR catalysts, three-way catalysts, and diesel oxidation catalysts. The filter according to the invention is particularly advantageously used in combination with a three-way catalyst, in particular on its downstream side. It is particularly advantageous if the filter itself is a three-way catalytically active filter. The filters produced by the method according to the invention, optionally coated with catalytically active powder, are suitable for all these applications. The use of the filters according to the invention for the treatment of exhaust gases of a stoichiometrically operated internal combustion engine is preferred.

Wall-flow filters with a catalytic activity that eliminates nitrogen oxides and hydrocarbons and carbon monoxide (HC, CO, and NOx) in the stoichiometric exhaust gas ($\lambda$=1 conditions) are usually referred to as catalyzed gasoline particulate filters (cGPF). In addition, they can convert the oxides of the nitrogen under rich exhaust gas conditions and CO and HC under lean conditions. The powders used here, in particular the second powder when two powders are used, can be correspondingly catalytically active. They for the most part contain platinum group metals, such as Pt, Pd, and Rh, as catalytically active components, wherein Pd and Rh are particularly preferred. The catalytically active metals are often deposited with high dispersion on large-surface oxides of aluminum, zirconium, and titanium, or mixtures thereof, which may be stabilized by additional transition elements, such as lanthanum, yttrium, praseodymium, etc. Such three-way catalysts also contain oxygen-storing materials (for example, Ce/Zr mixed oxides; see below). For example, a suitable three-way catalytic coating is described in EP1181970B1, EP1541220B1, WO2008113445A1, WO2008000449A2, to which reference is hereby made with regard to the use of catalytically active powders.

The requirements applicable to gasoline particulate filters differ significantly from the requirements applicable to diesel particulate filters (DPF). Diesel engines without DPF can have up to ten times higher particle emissions, based on the particle mass, than gasoline engines without GPF (Maricq et al., SAE 1999-01-01530). In addition, there are significantly fewer primary particles in the case of gasoline, engines and the secondary particles (agglomerates) are significantly smaller than in diesel engines. Emissions from gasoline engines range from particle sizes of less than 200 nm (Hall et al., SAE 1999-01-3530) to 400 nm (Mathis et al., Atmospheric Environment 38 4347) with a maximum in the range of around 60 nm to 80 nm. For this reason, the nanoparticles in the case of GPF must mainly be filtered by diffusion separation. For particles smaller than 300 nm, separation by diffusion (Brownian molecular motion) and electrostatic forces becomes more and more important with decreasing size (*Hinds, W.*: Aerosol technology: Properties and behavior and measurement of airborne particles. Wiley, 2nd edition 1999).

Due to their low particle relaxation time, small particles follow flowlines with almost no inertia. A random "trembling movement" is superimposed on this uniform, convection-driven movement. Following this theory, the largest possible flowed-around surfaces should be provided for a good filtration effect of the GPF. The powder should therefore have a high proportion of fines, since with the same total volume of oxide, small particles offer significantly larger surfaces. At the same time, however, the pressure loss must only increase insignificantly. This requires a loose crosslinking of the powder. The powders should advantageously be fixed to the carrier without prior or subsequent treatment. For a powder suitable for producing the filters according to the invention, an optimization between the largest possible surface area of the powder used, the crosslinking, and the adhesive strength is advantageous.

Various catalytic functions may also be combined with one another. The three-way catalysts just mentioned may, for example, be equipped with a nitrogen oxide storage functionality (TWNSC). As stated above, these catalysts consist of materials that, under stoichiometric exhaust-gas conditions, impart to the catalyst the function of a three-way catalyst, and that have a function for the storage of nitrogen oxides under lean exhaust-gas conditions. These stored nitrogen oxides are regenerated during brief rich operating phases in order to restore storage capability. The manufacturing of a corresponding TWNSC preferably takes place by assembling materials that are used for the construction of a three-way catalyst and a nitrogen oxide storage catalyst. A particularly preferred embodiment of such a catalyst is described in WO2010097146A1 or WO2015143191A1, for example. However, during the regeneration, an air/fuel mixture is preferably maintained which corresponds to a λ of 0.8 to 1. This value lies particularly preferably between 0.85 and 0.99, and very particularly preferably between 0.95 and 0.99.

A preferred device for producing a wall-flow filter according to the invention is schematically illustrated in FIG. 8. Such a device is characterized in that
- at least one unit for dispersing powder in a gas;
- at least one unit for mixing the powder/gas aerosol with an existing gas stream;
- at least one, more preferably two, filter-receiving units which are each designed to allow the gas stream to flow through the filter without further supply of a gas;
- a suction-generating unit that maintains the gas stream through the filter;
- optionally, at least one unit for generating vortices upstream of the filter so that a deposition of powder on the inlet plugs of the filter is prevented as much as possible; and
- optionally, a unit by which at least one partial gas stream is extracted downstream of the suction device and, before the powder addition, is added to the gas stream which is sucked through the filter; are present.

At least two filters can be coated in parallel with different or identical powders by means of at least 2 filter-receiving units. At least 2 or more filters can thus be completed per production cycle. By multiplying the systems or the receptacles, the cycle time can be shortened by serial or parallel operation.

The preferred embodiments for the wall-flow filter or the method and the advantages mentioned also apply mutatis mutandis to the use and the device shown. Reference is explicitly made in this respect to what was said above about the wall-flow filter or about the method.

By means of the filter according to the invention, it is possible to obtain a high filtration efficiency, in particular for small-particulate soots, such as those emitted from spark-ignition engines. In this case, the exhaust-gas back pressure does not increase unduly. The filters, if catalytically active, exhibit excellent catalytic activity. The exhaust-gas back pressure and the filtration efficiency can be specifically adapted to customer requirements. In particular, in embodiments of the present invention in which the second or a further powder is coated with noble metal, the first powder helps to inhibit the expensive noble metal powders from penetrating through the wall-flow filter. All noble metal is therefore deposited in the filter. A correspondingly produced wall-flow filter was not yet known from the prior art.

FIGURES

FIG. 1: An image of a wall-flow filter wall dusted with a powder, wherein the powder is seated in the pores. The powder 100, in this case a non-pyrogenic powder having a d50 of 3 μm, forms the first layer and is deposited in the pores and in the pore inputs of the porous filter substrate 200. If the amount of powder is increased, an on-wall layer would additionally form.

FIG. 2: Schematic drawing of a wall-flow filter inlet channel which has been exposed twice to a powder according to the invention. In this case, the amount of powder has an increase in the flow direction. The first powder 302 is deposited in this schematic representation in the pores of the porous filter substrate 303. The volumetric flow distribution 304 in the wall flow results in increased deposition at the end of the filter, delimited by the plug 300. The second powder 301 is deposited on the powder 302. In this case, too, a gradient of the amount of powder is found. The powder 302 predominantly takes over the filtration, the powder 301 contains, for example, noble metals and forms a catalytically active layer, as is required for soot burn-off.

FIG. 3: A schematic drawing of a wall-flow filter pore, which according to the invention was exposed twice to a powder. At least the first powder is seated in the pores. The first powder 312 blocks the pore of the porous filter 303, but the powder 312 is pyrogenic and thus highly porous. It produces only a small pressure loss for the gas stream 310 but nevertheless has a good filtering effect for finer particles. The second powder 311 is clearly finer in this case and is filtered out of the gas stream 310 by the powder 312 during production. The powder 312 has the filtration task, and the powder 311 has the task, for example, of accelerating the soot burn-off.

Figure 4:
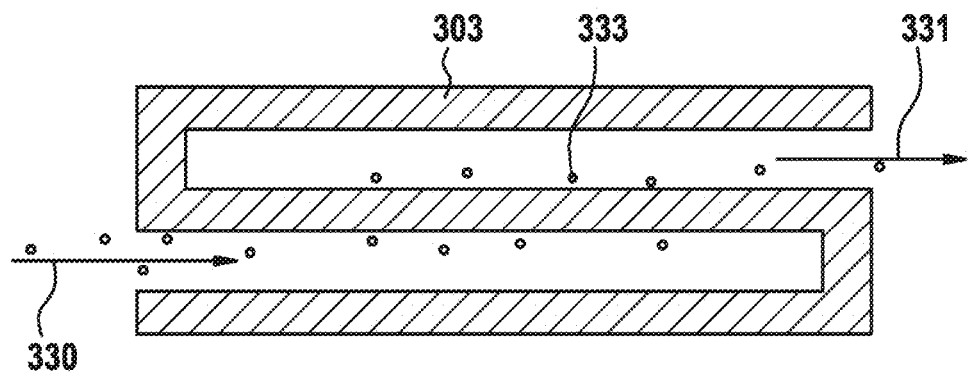

FIG. 4: A schematic drawing of a wall-flow filter with powder penetration during coating. The catalytically active powder 333 is not sufficiently filtered out of the gas stream 330 by the filter substrate 303. The gas stream 331 contains significant amounts of the catalytically active material 333.

Figure 5:
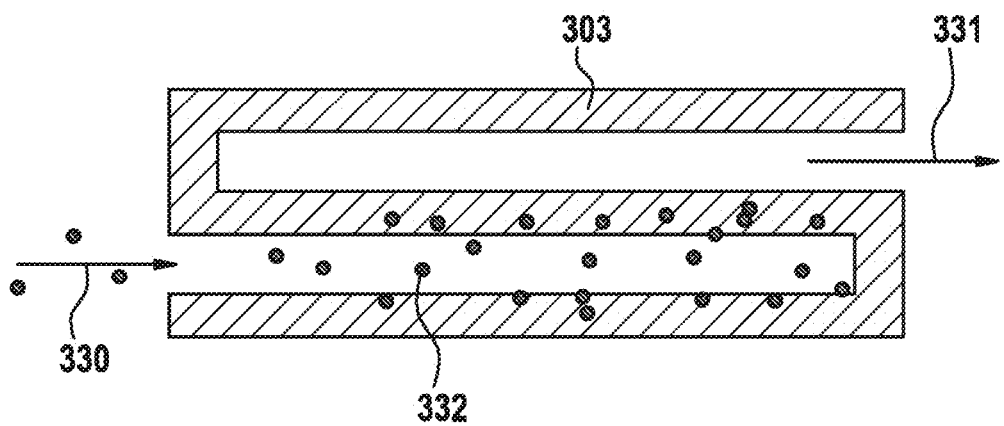

FIG. 5: A schematic drawing of a wall-flow filter with the structure of a barrier layer of powder which prevents the second powder from penetrating through, see FIG. 6. The coarser pyrogenic material 332 is filtered out of the gas stream 330 through the porous matrix of the filter 303. A porous filter cake is formed on the cell walls and in the pores. The exhaust air stream 331 is virtually free of particles.

Figure 6:
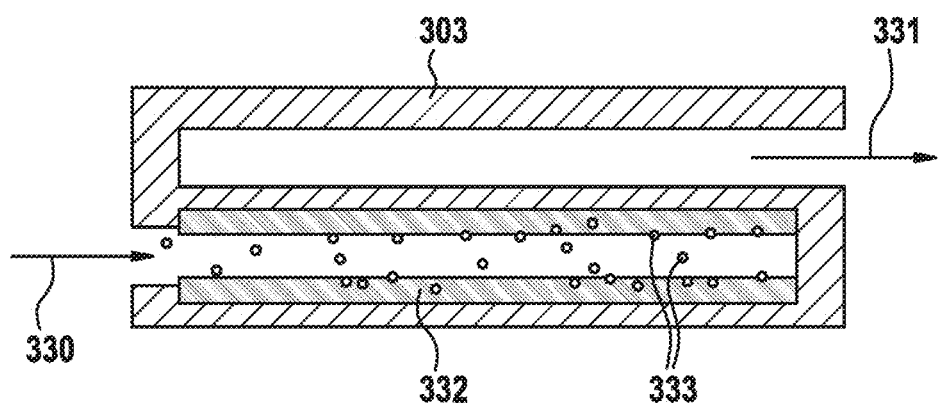

FIG. 6: A schematic drawing of a wall-flow filter with the structure of a functional powder layer on a barrier layer of powder. The filter cake, formed of the porous coarser particles 332, in the pores and on the cell walls of the filter 303 now filters the finer catalytically active particles 333 from the gas stream 330. The exhaust gas stream 331 is now virtually free of particles.

Figure 7:
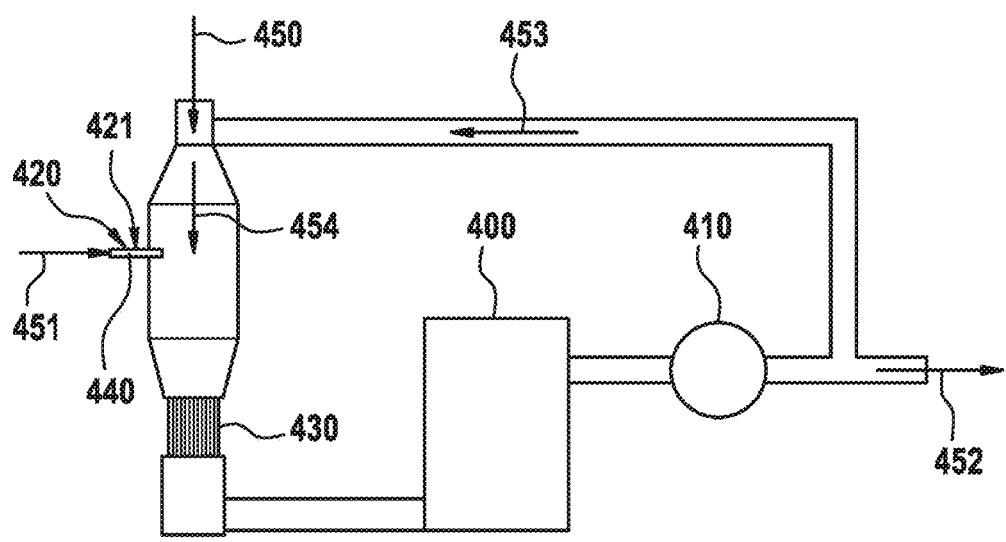

FIG. 7: A schematic drawing of an advantageous device. The powder 420 or 421 is mixed with the gas under pressure 451 through the atomizer nozzle 440 in the mixing chamber with the gas stream 454 and then is sucked or pushed through the filter 430. The particles that have penetrated are filtered out in the exhaust filter 400. The blower 410 provides the necessary volumetric flow. The exhaust gas is divided into an exhaust 452 and a warm cycle gas 453. The warm cycle gas 453 is mixed with the fresh gas 450.

FIG. 8: A schematic representation of the chamber for dispersing the powders with 2 dispersing nozzles, one for each powder. The powder 1500 is conveyed via the dispersing nozzle 1410 with a gas under pressure 1400 into the chamber 2000 where it is mixed with the transport gas 1200. This mixture 1300 then flows to the filter to be coated. Subsequently, the powder 1800 in the dispersing nozzle 1910 is also dispersed with a gas under pressure 1900 and transported into the chamber 2000 where it is mixed with the transport gas 1200. This mixture 1300 then flows to the filter to be coated.

FIG. 9: A schematic representation of the chamber for dispersing the powders with 1 dispersing nozzle but for two different powders. The powder 1500 is conveyed via the dispersing nozzle 1910 with a gas under pressure 1900 into the chamber 2000 where it is mixed with the transport gas 1200. This mixture 1300 then flows to the filter to be coated. Subsequently, the powder 1800 in the dispersing nozzle 1910 is also dispersed with a gas under pressure 1900 and transported into the chamber 2000 where it is mixed with the transport gas 1200. This mixture 1300 then flows to the filter to be coated. This variant can be selected if the properties of the powders, such as the flowability, permit it.

Figure 10:
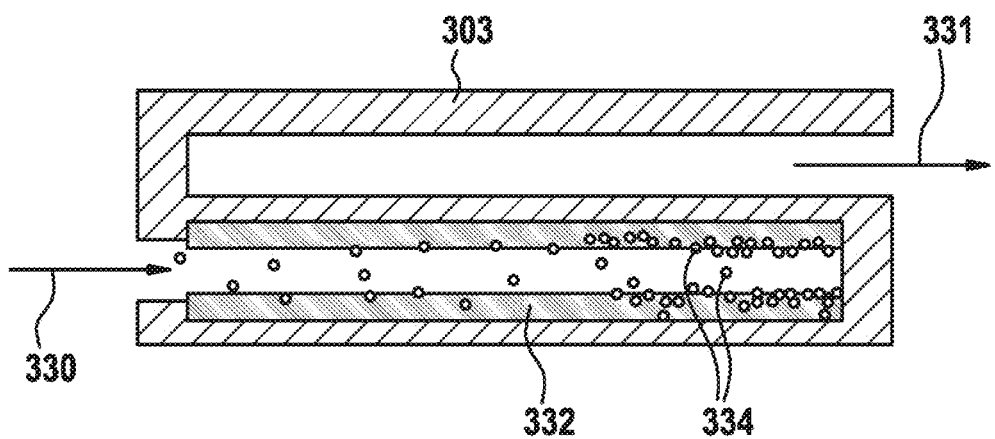

FIG. 10: A schematic drawing of a wall-flow filter with the structure of a functional powder layer on a barrier layer of powder. The filter cake, formed of the porous coarser particles 332, in the pores and on the cell walls of the filter 303 now filters the finer catalytically active particles 334 out of the gas stream 330. The exhaust gas stream 331 is now virtually free of particles. A high gas velocity during coating and the selection of relatively coarse or heavier particles 334 forms an on-wall zone made of catalytically active material which is particularly pronounced in the last third of the filter. Since, as a rule, 50% of the volumetric flow passes through the wall, this powder is catalytically very active.

Figure 11:
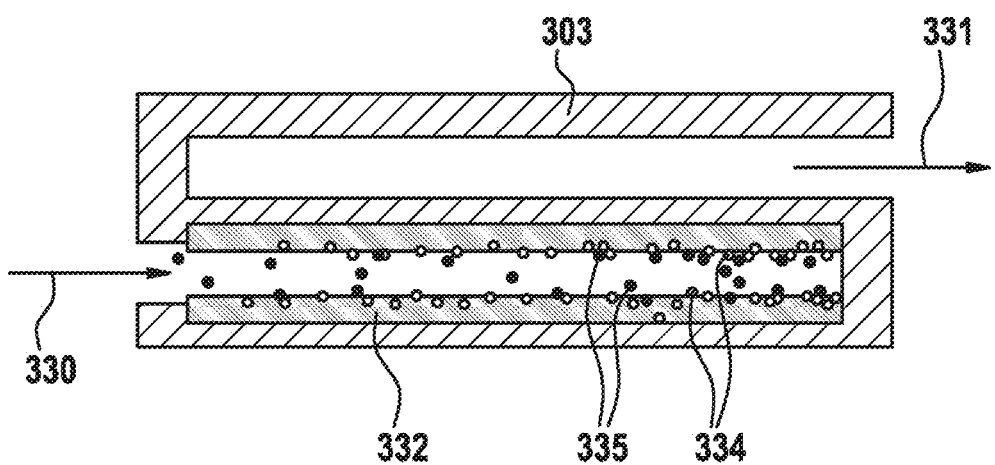

FIG. 11: A schematic drawing of a wall-flow filter according to the invention with the structure of a functional powder layer on a barrier layer of powder. The filter cake in the pores and on the cell walls of the filter 303 formed of the porous coarser particles 332 that have picked up the finer catalytically active particles 334. The particles 334 are composed, for example, of aluminum oxide with a higher coating of particles. The soot 335 in the exhaust gas stream is now deposited following the exhaust gas volumetric flow exactly where the catalytically active particles have also been deposited. The soot burn-off now starts earlier and the pressure loss and thus the gasoline consumption are lower over time.

Figure 12:
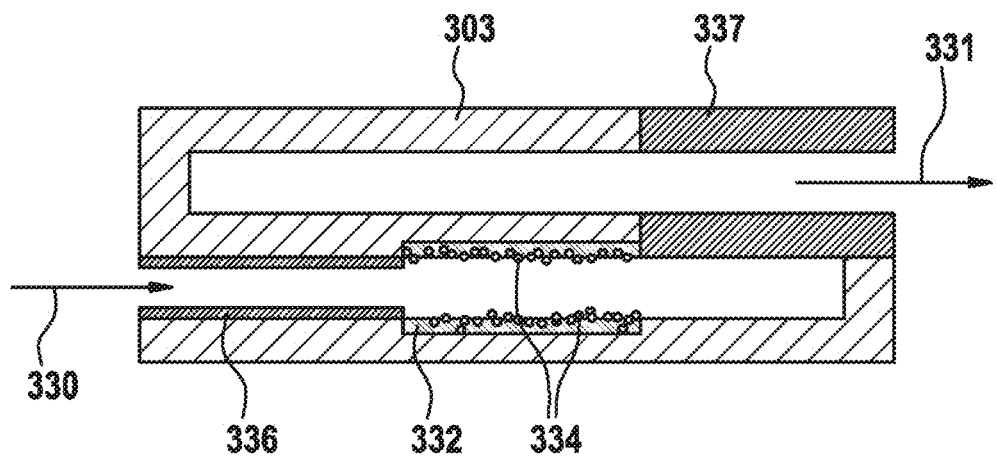

FIG. 12: A schematic drawing shows a preferred form of an embodiment of the invention for a filter having different permeabilities. The two washcoat zones 336 and 337, which may be located on the wall, in the wall, or both in and on the wall, significantly reduce the permeability in the illustrated example. The filtering powder layer 332 and the catalytically active powder particles 334 are then in the high permeability range. They are very effective there with regard to filtration as well as with regard to catalysis because a significant portion of the exhaust air stream runs there. The pressure loss in this design is surprisingly low.

Figure 13:
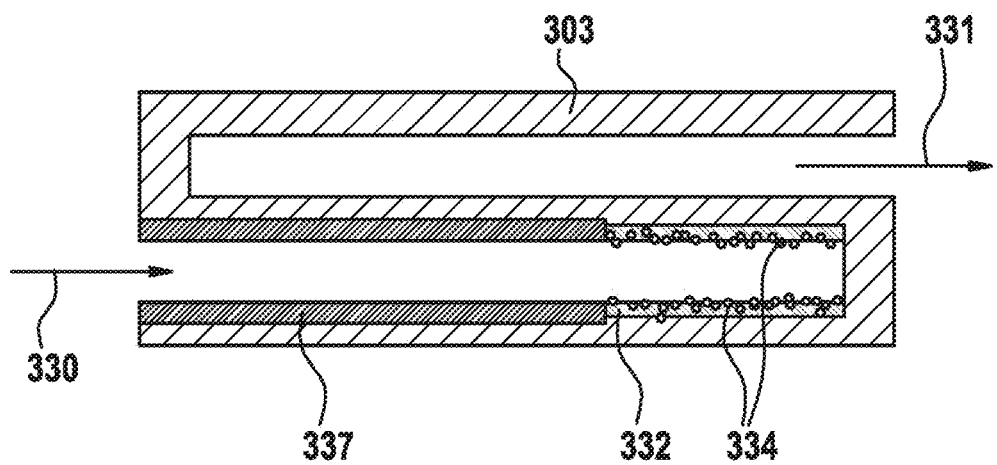

FIG. 13: A schematic drawing shows another preferred form of an embodiment of the invention for a filter having different permeabilities. The washcoat zone 337, which may be on the wall, in the wall, or both in and on the wall, significantly reduces the permeability in the illustrated example. The filtering powder layer 332 and the catalytically active powder particles 334 are then in the high permeability range. They are very effective there with regard to filtration as well as with regard to catalysis because a significant portion of the exhaust air stream runs there. The pressure loss in this design is surprisingly low.

The invention claimed is:

1. Wall-flow filter for reducing the harmful substances in the exhaust gas of an internal combustion engine,
characterized in that
on its inlet side, the dry filter has been exposed at least twice successively to different dry powder-gas-aerosols, each of which has at least one high-melting metal compound.

2. Wall-flow filter according to claim 1,
characterized in that
the filter was catalytically coated prior to being exposed to the first powder-gas-aerosol.

3. Wall-flow filter according to claim 1,
characterized in that
during the first exposure, the powder precipitates in the pores of the filter walls and fills them at least up to the inlet surface and thereby does not form a cohesive layer on the walls of the filter over the entire length of the filter.

4. Wall-flow filter according to claim 1,
characterized in that
the total amount of powder remaining in the filter is below 100 g/l.

5. Wall-flow filter according to claim 1,
characterized in that
the final powder coating has an increasing concentration gradient over the length of the filter from the inlet side to the outlet side.

6. Wall-flow filter according to claim 5,
characterized in that
the concentration gradient is created such that in a region near the inlet side and in a region in the center of the filter, less than 40% of the wall surface of the inlet channel are respectively coated with powder, while in a region near the outlet side, more than 40% of the wall surface of the inlet channel are coated with powder.

7. Wall-flow filter according to claim 1,
characterized in that
when filter substrates with square channels are used, the powder coating in the corners of the channels is thicker than in the corresponding center of the inlet surface.

8. Wall-flow filter according to claim 1,
characterized in that
the aerosols are a mixture of air and the powder of the at least one high-melting metal compound, with the at least one high-melting metal compound being selected from the group consisting of a metal oxide, metal sulfate, metal phosphate, metal carbonate, or metal hydroxide powder, or mixtures thereof.

9. Wall-flow filter according to claim 1,
characterized in that
at least one of the powders is catalytically active with regard to reducing the harmful substances in the exhaust gas of an internal combustion engine.

10. Wall-flow filter according to claim 1,
characterized in that
the first powder has a mean particle diameter (d50) of $>\frac{1}{10}$ and $<3$ of the mean pore diameter (d50) of the filter.

11. Wall-flow filter according to claim 1, characterized in that the first powder has a tamped density of <200 kg/m³.

12. Wall-flow filter according to claim 1, characterized in that the second or the further powders have a mean particle diameter (d50)<1/10 of the mean pore diameter.

13. Wall-flow filter according to claim 1, characterized in that the second or the further powders have a tamped density of between 50 kg/m³ and 1200 kg/m³.

14. Wall-flow filter according to claim 1, characterized in that the filter has a catalytically active powder zone in the last third of the filter in the inlet channel.

15. Method for producing a wall-flow filter according to claim 1 for reducing the harmful substances in the exhaust gas of an internal combustion engine, wherein a dry filter is exposed on its inlet surface at least twice successively to different dry powder-gas-aerosols, each having at least one high-melting metal compound, characterized in that the powders are dispersed one after the other in the gas, then guided into a gas stream, and sucked into the inlet side of the filter without further supply of a gas.

16. Method for producing a wall-flow filter according to claim 15, characterized in that the aerosols are sucked through the filter at a velocity of 5 m/s to 60 m/s.

17. Method according to claim 15, characterized in that the dispersion of the powders in the gas is in each case effected by at least one of the following measures:
Dispersion by means of compressed air
Dispersion by ultrasound
Dispersion by sieving
Dispersion by "in-situ milling"
Dispersion by blower
Dispersion by expansion
Dispersion in the fluidized bed.

18. Method according to claim 15, characterized in that at least one partial gas stream is extracted downstream of the suction device and, before the powder addition, is added to the gas stream which is sucked through the filter.

19. Method according to claim 15, characterized in that a defined powder distribution over the filter cross section is adjusted by an accelerated flow upstream of the filter.

20. Method according to claim 15, characterized in that the powders are vortexed before flowing into the filter in such a way that deposits of the powders on the inlet plugs of the wall-flow filter are prevented as much as possible.

21. A method of reducing harmful exhaust gases of an internal combustion engine comprising passing the exhaust gases through the wall-flow filter according to claim 1 for reducing harmful exhaust gases of an internal combustion engine.

22. The method according to claim 21, characterized in that the filter is used in an exhaust system together with one or more catalytically active aggregates selected from the group consisting of nitrogen oxide storage catalyst, SCR catalyst, three-way catalyst, and diesel oxidation catalyst.

23. Wall-flow filter for reducing the harmful substances in the exhaust gas of an internal combustion engine, wherein the wall-flow filter has a dry filter substrate and, on the dry filter substrate inlet side, the dry filter substrate has been exposed at least twice successively to different dry powder-gas-aerosols, and wherein a first powder of the different dry powder-gas-aerosols is pyrogenic and has a mean particle diameter (d50) that is greater than a second powder of the different dry powder-gas-aerosols such that the first powder is coarser than the second powder, and wherein the first applied powder is seated in pores of the dry filter substrate and the second, finer dry powder is blocked from passage through the pores by the coarser first powder seated in the pores, and wherein the first powder has no catalytic activity and the second powder has soot ignition catalytic activity.

24. Wall-flow filter according to claim 23, wherein the finer dry powder coating has an increasing concentration gradient over the length of the filter from the inlet side to the outlet side.

25. Wall-flow filter according to claim 23, wherein the first powder of the different dry powder-gas-aerosols has a mean particle diameter (d50) of >1/10 and <3 of the mean pore diameter (d50) of the filter substrate and the second powder of the different dry powder-gas-aerosols has a mean particle diameter (d50)<1/10 of the mean pore diameter as to provide for the first powder being coarser than the second powder, and the first powder is sized for in-wall receipt in the dry filter substrate and blockage of the finer second powder from passage through the pores of the dry filter substrate.

* * * * *